United States Patent [19]
Hasebe et al.

[11] Patent Number: 5,539,524
[45] Date of Patent: Jul. 23, 1996

[54] IMAGE PROCESSING APPARATUS

[75] Inventors: Takashi Hasebe; Satoshi Haneda, both of Hachioji, Japan

[73] Assignee: Konica Corporation, Tokyo, Japan

[21] Appl. No.: 129,389

[22] Filed: Sep. 30, 1993

[30] Foreign Application Priority Data

Oct. 14, 1992 [JP] Japan .................................. 4-276254

[51] Int. Cl.⁶ .............................................. H04N 1/393
[52] U.S. Cl. ........................ 358/296; 358/451; 358/453; 382/260
[58] Field of Search .................................. 355/218, 243, 355/244; 358/296, 450, 451, 453; 382/44, 45, 47; 347/129, 900

[56] References Cited

U.S. PATENT DOCUMENTS

| | | |
|---|---|---|
| 4,538,182 | 8/1985 | Saito et al. . |
| 4,538,183 | 8/1985 | Kanno et al. . |
| 4,908,716 | 3/1990 | Sakano ............................... 358/453 |
| 5,029,224 | 7/1991 | Fujisawa ............................ 358/453 |
| 5,034,806 | 7/1991 | Ikeda et al. ........................ 358/450 |
| 5,075,787 | 12/1991 | Shaughnessy ..................... 358/453 |
| 5,099,336 | 3/1992 | Moriya . |
| 5,153,737 | 10/1992 | Kobayashi . |
| 5,363,211 | 11/1994 | Hasebe et al. ..................... 382/47 |

FOREIGN PATENT DOCUMENTS 62-157070A 7/1987 Japan .
2-27369A 1/1990 Japan .

OTHER PUBLICATIONS

Patent Abstracts of Japan, JP 2253377, Oct. 12, 1990.
Patent Abstracts of Japan, JP 3239268, Oct. 24, 1991.
Patent Abstracts of Japan, JP 4230168, Aug. 19, 1992.

*Primary Examiner*—John E. Barlow, Jr.
*Attorney, Agent, or Firm*—Finnegan, Henderson, Farabow, Garrett & Dunner

[57] ABSTRACT

An image processing machine includes a reader in which a document image is read by photoelectric conversion so that color image data are obtained, and a marker area detector by which image processing area respectively specified by color markers on a plurality of documents are detected according to the obtained color image data. The image processing machine further includes an image replacing processor by which image data is output. The image data is obtained by replacing an image in an image processing area of one document with an image in another image processing area of another document between a plurality of documents according to a detection result by the marker area detector and the image data read by the reader.

3 Claims, 21 Drawing Sheets

FIG. 4 (b)
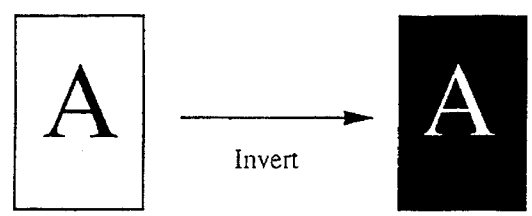
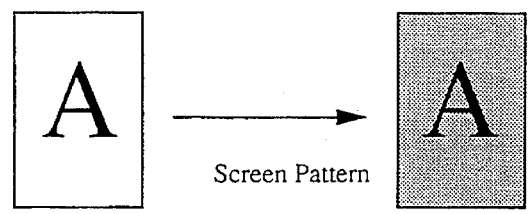
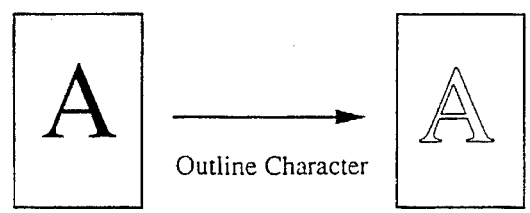
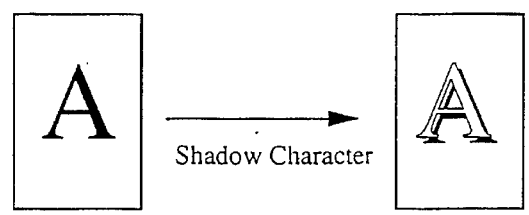
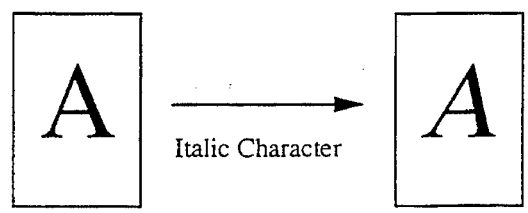
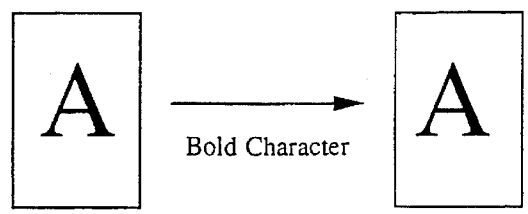

IMAGE PROCESSING APPARATUS

BACKGROUND OF THE INVENTION

The present invention relates to an image processing apparatus, and more particularly to an apparatus in which an image can be easily replaced with another image among a plurality of documents.

Conventionally, a digital type copier has been widely known which is structured as follows: a document is optically scanned; an optical image is received by a photoelectric conversion element such as a line image sensor so that the image is converted into an electric signal; the signal is converted into a digital signal; and an electrostatic latent image is formed on a photoreceptor by a writing device such as a semiconductor laser according to image information of the document which has been converted into the digital signal. (Refer to Japanese Patent Publication Open to Public Inspection No. 157070/1987).

Some digital type color copiers have editing processing functions of the image information in which various image processing such as color conversion, trimming, reversing, masking, and halftoning are conducted with respect to a specified area of the document, and image information can be recorded. (Refer to Japanese Patent Publication Open to Public Inspection No. 27369/1990.)

In the above described image processing according to the specified area, when the image processing area is specified by marking using a marker, the color of which is different from the color of the document to be read, the subject image to be read can be discriminated from information of the specified area.

In copying operations, it is desired in some cases that only necessary portions of two sheets of document are synthesized with each other so that desired copies can be obtained. In this case, conventionally, documents are pasted-up and synthesized on the document to be read, and then, recording operations are conducted. In the case where documents are synthesized on the image data, image data obtained by reading two sheets of document are synthesized using an editor for editing. Further, in the case where it is desired to obtain a hard copy of the synthesized image, it is necessary that the synthesized image data is inputted into a printer (a digital type copier) and a recording operation is carried out.

As described above, in the conventional digital type copier, various image processing can be easily carried out on one document when the apparatus is provided with a marker edit function. However, when two documents are synthesized, troublesome operations are necessary, which is a problem.

SUMMARY OF THE INVENTION

An object of the present invention is to provide an image processing apparatus in which two document images are easily synthesized and outputted, using a marker edit function in which an image processing area can be easily specified by a marker pen.

The image processing apparatus according to the present invention comprises: a reading means in which a document image is read by photoelectric conversion so that color image data can be obtained; a marker area detection means by which image processing areas respectively specified by color markers on a plurality of documents are detected according to color image data; and an image replacement processing means by which image data is outputted, wherein the image data is obtained by replacing an image in an image processing area of one document with an image in another image processing area of another document between a plurality of documents according to a detection result by the marker area detection means and the image data read by the reading means.

Here, it is preferable that image replacement processing by the image replacement processing means is carried out between image processing areas specified by the same marker color on different documents. Further it is preferable that the image replacement processing means checks respective dimensions of image processing areas in which one image detected by the marker area detection means is replaced with another image, and magnification processing is carried out according to a ratio of the dimension of the area in which the image to be replaced is specified, and that of the area in which the foregoing image is replaced.

Further, the apparatus may be structured as follows. The image replacement processing means comprises a toner image forming means by which a toner image is formed on an image supporting material, and a transferring and fixing means by which a toner image is fixed after the toner image formed on the image supporting material has been transferred onto a recording sheet. When the toner image corresponding to an image outside of the image processing area of one document is superimposed with the toner image corresponding to an image in the image processing area of another document by the toner image forming means on the image supporting material, a toner image corresponding to the image which is processed for replacement is formed on the image supporting material, and is transferred and fixed onto the recording sheet by the transferring fixing means, and then the recording sheet is delivered.

Further, the apparatus may be structured as follows. Instead of synthesis on the image supporting body, the image replacement processing means includes an image memory means in which color image data is stored. The image memory means synthesizes image data of two documents, and the image data processed for replacement can be obtained.

Due to the image processing apparatus thus structured, a document image is read by photoelectric conversion. From color image data obtained by the foregoing reading of a plurality of documents, image processing areas respectively specified by color markers on a plurality of documents are detected. Then, image data which is formed when an image in the image processing area specified by a color marker on one document (a replacement image), is replaced with an image in the image processing area (an area to be replaced) specified by a color marker on another document between a plurality of documents, is outputted. That is, when it is desired to synthesize an image on one document to a predetermined area of another document, an image is synthesized according to designation of the color marker after an area, in which an image is synthesized, and an image to be synthesized have been specified by the color marker on each document.

In an image replacement operation between areas to be specified by the color marker, when areas in which images are replaced are respectively specified by the same marker color, the relation between them can be easily discriminated.

Further, when dimensions of respective areas, in which images are replaced with each other, specified by a color marker are checked, and magnification processing is conducted on image data corresponding to the ratio of dimensions of the specified areas and replacement is conducted, image synthesis accompanied with magnification processing can be easily realized.

Further, in the synthesis operation of images, images can be synthesized on image data using an image memory means in which image data is stored. However, when a transferring fixing means is provided in which a toner image is formed on the image supporting material according to image data which has been read, and the toner image is transferred and fixed onto a recording sheet, the apparatus may be structured as follows. An image is synthesized on the image supporting material as a toner image when a toner image according to one document is superimposed onto another toner image according to another document. Then, the toner image is transferred and fixed onto the recording sheet, and the recording sheet on which a synthesized image is formed is outputted.

DETAILED DESCRIPTION OF THE PREFERRED EMBODIMENT

An example of the present invention will be described as follows.

Figure 1:
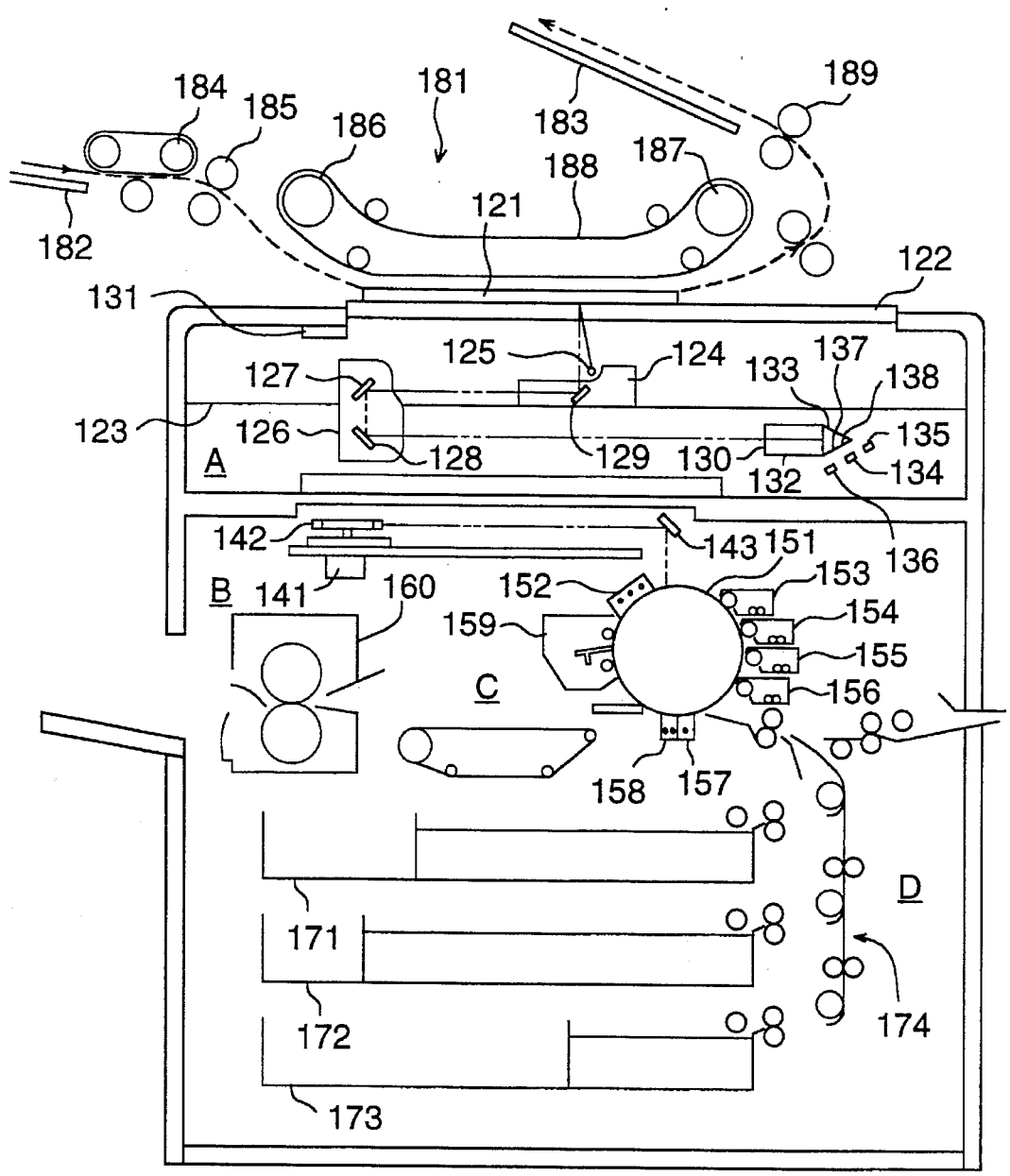
FIG. 1 is a view showing the entire structure of a digital type color copier of the example.

In the example, a case in which an image processing apparatus is applied to a digital type color copier will be described as follows. FIG. 1 is a view showing the entire structure of the digital type color copier in the example.

In FIG. 1, the digital type color copier comprises a reading-out unit A, a writing unit B, an image forming section C, a sheet feed section D, and further an image processing section E (not shown in the drawing).

In the example, as will be described later, the reading-out means includes the reading-out unit A, the image processing section E has a function as a marker area detection means, and further, a function as an image replacement means is realized by the image processing section E itself, or a combination of the writing unit B with the image forming section C and the image processing section E.

In the reading-out unit A (a reading-out means), a document 121 is placed on a platen glass 122, and illuminated by a halogen light source 125 provided on a carriage 124 which is moved on a slide rail 123. Mirrors 127 and 128 are provided in a movable mirror unit 126. The movable mirror unit 126 is moved on the slide rail 123 and reflection light (an optical image) from the document 121 on the platen glass 122 is guided to a lens reading-out unit 130 when the mirrors 127 and 128 are combined with a mirror 129 provided on the carriage 124.

A reference white plate 131 is provided on a rear side of an end portion in the secondary scanning direction (the moving direction of the mirror) of the platen glass 122. The reading-out unit A is structured in the manner that: when the reference white plate 131 is read at the time of document reading, a reference white signal (a reference white level signal) is obtained.

The lens reading-out unit 130 comprises a lens 132, a prism 133, a red channel CCD 134, a green channel CCD 135, and a blue channel CCD 136.

The optical image of the document 121 transmitted by the mirrors 129, 127, and 128 is converged by the lens 132, and separated by dichroic mirrors 137 and 138 into a red (R) channel image, a green (G) channel image, and a blue (B) channel image. These channel images are respectively formed on the light receiving surfaces of a red channel CCD, a green channel CCD 135, and a blue channel CCD 136, and optical images are photoelectrically converted into electric signals (electric image information) by CCDs 134 to 136. Of course, images may be photoelectrically converted by color CCDs.

An electric signal outputted from the red channel CCD 134, the green channel CCD 135, and the blue channel CCD 136, is outputted to the writing unit B after density conversion, color reproduction processing, marker editing processing, space filtering processing, and variable magnification processing have been conducted in the image processing section E which will be described later.

The writing unit B modulates laser beams generated by a semiconductor laser, which is not shown in the drawing, according to the image signal which has been inputted into the writing unit B. When the laser beams thus obtained are incident on a polygonal mirror 142 rotated by a drive motor 141, rotational scanning is carried out by the polygonal mirror 142. Laser beams pass through an f8 lens, and its optical path is deflected by a reflection mirror 143. Then, the laser beams are projected on the surface of a photoreceptor drum 151 provided in the image forming section C, and an electrostatic latent image is formed on the photoreceptor drum 151 which is uniformly charged.

The image forming section C comprises a charger 152 to uniformly charge the photoreceptor 151, four developing units 153 to 156 for each color, a transfer electrode 157, a separation electrode 158, a cleaning unit 159, and a fixing unit 160, other than the photoreceptor drum (an image carrier) 151. Four developing units 153 to 156 have respectively yellow Y, magenta M, cyan C, and black Bk toners, and formation and development processes of the electrostatic latent image of each color are repeated. Then, a yellow toner image, a magenta toner image, a cyan toner image and a black toner image are superimposed on the photoreceptor drum 151. After the superimposed color toner images are transferred onto a recording sheet supplied from the sheet feeding section D, the image on the recording sheet is fixed, and a color copy is obtained.

In this example, a toner image forming means corresponds to a structure structured by the writing unit B, the charger 152, and developing units 153 to 156. A transfer and a fixing means corresponds to a structure structured by the transfer electrode 157, the separation electrode 158, and the fixing unit 160.

The sheet fixing section D comprises cassettes 171 to 173 in which recording sheets are stocked by each size, and a recording sheet conveyance mechanism 174 including a plurality of conveyance rollers and conveyance belts, and recording sheets are supplied from corresponding cassettes 171 to 173 to the image forming section C according to a command of a size of the recording sheet.

Further, in the digital type color copier in the example, an ADF (automatic document feeder) 181, by which a document to be read is automatically conveyed onto the platen glass 122, is provided on the reading-out unit A. The ADF has the following functions. When a plurality of documents to be read are set being stacked on the platen glass 182, documents are automatically conveyed in succession to a predetermined position on the platen glass 122, and the document having been read is removed from the platen glass 122 and discharged onto a discharged document tray 183.

In order to automatically convey the document, the ADF 181 has a feeding roller 184 to pull in the documents placed on the platen glass 182 one by one; an intermediate conveyance roller 185; a drive roller 186 and a driven roller 187; a conveyance belt 188 wound around the drive roller 186 and the driven roller 187; and a discharging roller 189.

The conveyance belt 188 forms a background portion of the document 121 under the condition that the document 121 is conveyed onto the platen glass, and corresponds to a document cover.

Although the digital type color copier in the foregoing is structured in the manner that color is separated by the dichroic mirror, and separated colors are photoelectrically converted respectively by CCDs, these colors may be photoelectrically converted by a color CCD in which a color separation filter is accommodated.

Here, referring to block diagrams shown in FIG. 2 to FIG. 10, the circuit structure of the foregoing image processing section E will be described as follows.

Figure 2:
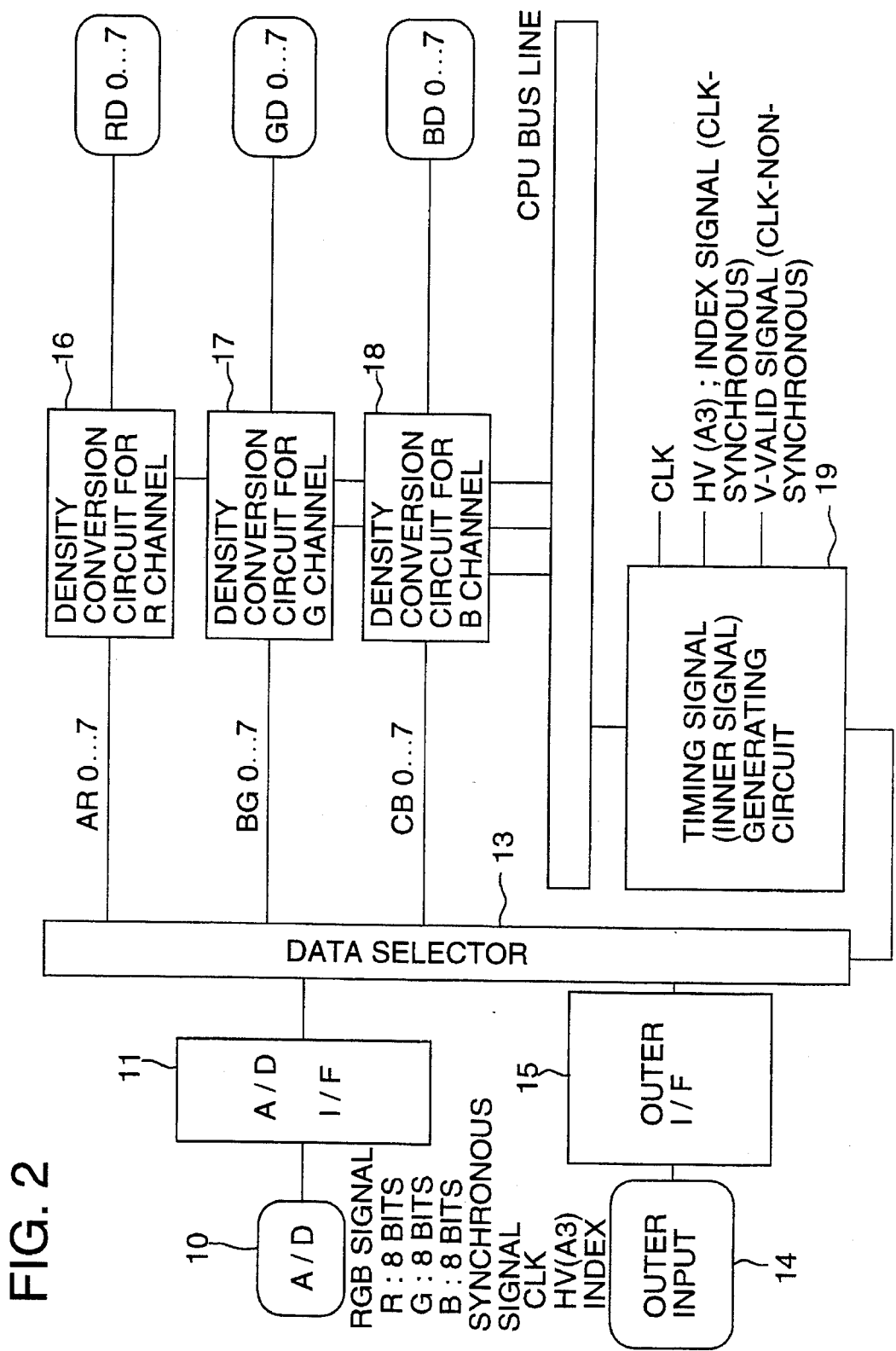
FIG. 2 is a block diagram showing an input/density conversion section of an image processing section.

FIG. 2 shows the input section and the density conversion section of color image information in the image processing section E.

In FIG. 2, three primary color image signals (analog signals) of red R, green G, and blue B outputted from the red channel CCD 134, the green channel CCD 135, and the blue channel CCD 136, are respectively converted into digital signals by the A/D converter 10.

The foregoing digitalized color image information is inputted into a data selector 13 through an interface 11. Image data from an outside apparatus such as a film projector can be also inputted into the data selector 13 through input terminals for the outside apparatus 14 and an interface for the outside apparatus 15.

Digital image signals AR, BG, and CB of R, G, and B outputted from the data selector 13 are respectively converted into density data RD, GB, and BD of three primary colors by density conversion circuits 16, 17 and 18.

In FIG. 2, numeral 19 is a timing generation circuit. Synchronous signals H–V, V—V, which are obtained from the writing unit B side, are supplied to the circuit 19 with respect to the direction of the primary scanning (the direction of a line of CCD elements) and the direction of the secondary scanning (the direction of the optical scanning) other than clock signals CLK, and various timing signals are formed according to these signals.

Figure 3:
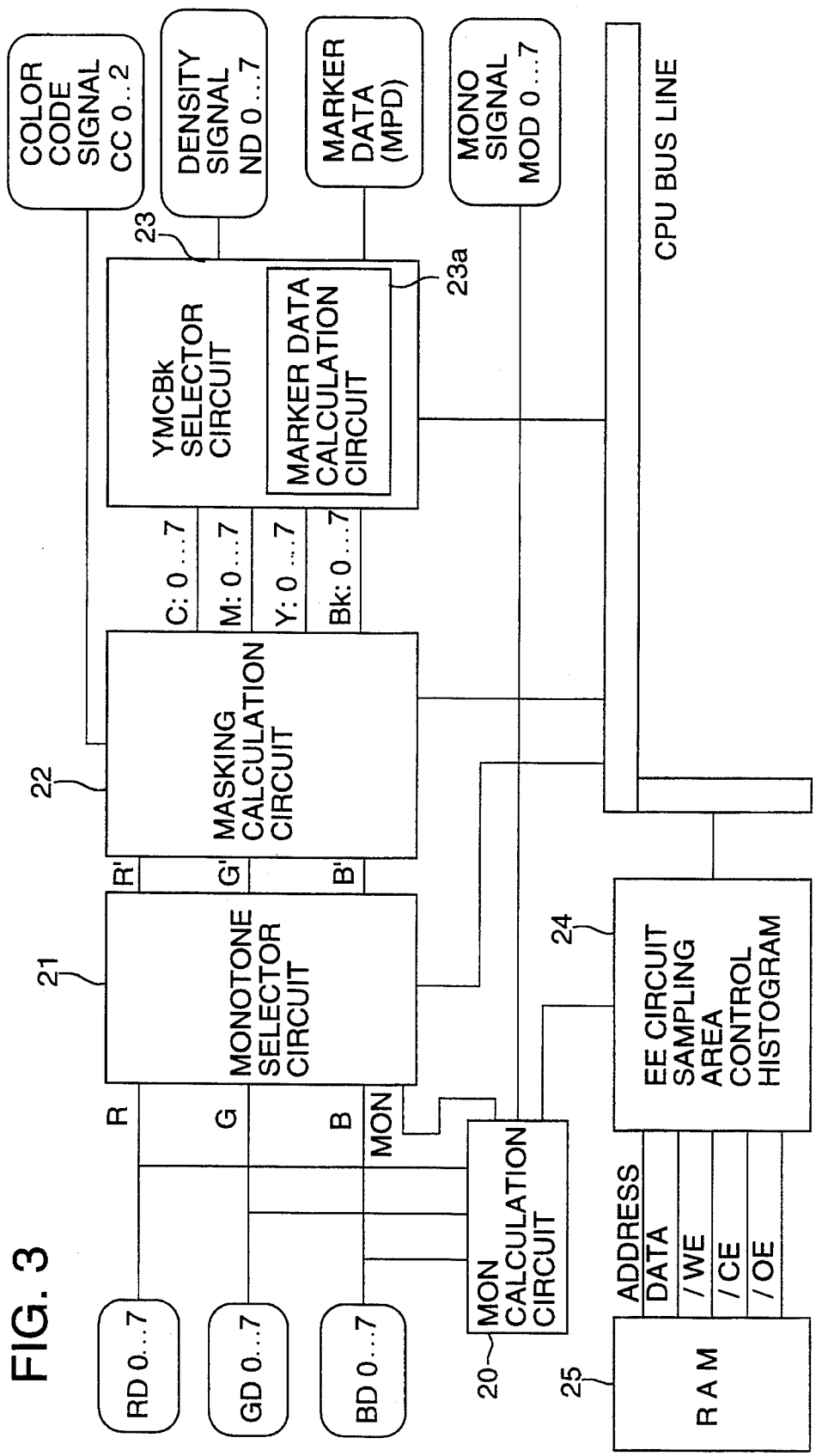
FIG. 3 is a block diagram showing a color reproduction/ EE circuit of the image processing section.

Further, the density data RD, GD, and BD are processed in a color reproduction and EE circuit as shown in FIG. 3.

In FIG. 3, the density data RD, GD, and BD are inputted into a MON calculation circuit 20, and a density data signal MOD for monochrome reproduction (monochrome) is calculated in the calculation circuit 20. In a monochrome selector circuit 21, into which the density data MOD and the density data RD, GD, and BD are inputted, three primary color density data are switched and outputted depending on a monochrome copy mode, for example, such as a sepia color, or a regular color copy mode. That is, this example has the function in which the document can be processed as a chromatic mono-color image such as a sepia color.

A masking circuit 22 into which the density data is inputted from the monochrome selector circuit 21, color discrimination is carried out for each color, and a color code signal CC showing to what color (for example, black Bk, yellow Y, magenta M, cyan C, white W) each pixel belongs is outputted.

Further, in the masking circuit 22, density information for each color of R, G, B is converted into density data for each color (toner color) of yellow Y, magenta M, cyan C, and black Bk, and these data are outputted. Density data for each color of Y, M, C, and Bk is selected in a selector circuit 23, and both of the color code signal CC and density data corresponding to the color code signal CC are outputted for each pixel.

A marker data calculation circuit 23a is accommodated in the selector circuit 23. The marker data calculation circuit 23a samples density data corresponding to the color code signal CC, and outputs information of the marker color (marker data MPD) as an average density.

The marker data MDP is outputted to a marker data discrimination circuit 102 which will be described later. The marker data discrimination circuit 102 stores the inputted marker data in a register which is accommodated in the circuit 102, and compares marker data stored in the resister with inputted marker data MPD. According to the result obtained by the comparison, writing of marker edit data of a marker area signal showing the marker area (an image processing area specified by a color marker) on the document is controlled, and the content of marker edit processing for each pixel is set. (Refer to FIG. 10) Details of edit data setting will be described later.

In FIG. 3, an EE circuit 24 is a circuit which collects image information in order to process corresponding to the document image, and a RAM 25 is a work memory which is used for making a density histogram.

The color code CC, a density signal ND showing density data, and further, a density signal MOD which is used at the time of monochrome reproduction, are processed by a marker edit processing section shown in FIG. 4(a).

As shown in FIG. 4(a), at the time of pre-scanning, a marker area processing circuit 32 (a marker area detection means) detects an image processing area (a marker area) specified by a marker pen (a color marker) in the manner that a closed loop is written on the document, according to the color code signal CC inputted through a delay circuit 31, and outputs a marker area signal. The marker area signal is stored in a discrimination information store circuit 105, which will be described later, as marker edit data for each pixel.

As shown in FIG. 4(b), at the time of regular scanning, various processing such as invert, screen pattern, outline character, shadow character, italic character, and bold character, are carried out corresponding to marker edit data, with respect to image data in the specified marker area detected at the time of pre-scanning.

Image data to be synthesized can be also inputted into the marker area processing circuit 32. The image data to be synthesized is image information which has been stored in a memory in advance. When the image data to be synthesized is inputted into the marker area processing circuit at a predetermined timed relation at the time of regular scanning, synthesized image data of image information obtained by regular scanning and image data to be synthesized can be outputted.

When partial color conversion processing is specified as one of marker edit processing, the color of the image in the marker area is converted into the color of the marker pen which is used, for example, for specifying the area in a processing circuit within marker area 37. That is, for example, in the case where the color of the image is black, even if density data of the image is outputted when a command to output yellow density data, for example, is given, a yellow image can be outputted instead of the black image.

A RAM 39 stores various control data which are used for detection of the specified marker area or various image processing.

The density signal ND corresponding to the color code signal CC is inputted into a color/monochrome selector 34 through a delay circuit 33. Further, the color code signal CC through the delay circuit 31, and a monochrome density signal MOD through an area discrimination circuit 36 are also inputted into the color/monochrome selector 34, and the selector 34 selectively outputs density data for a color copy and density data for a mono-color copy to the processing circuit within a marker area 37.

Figure 4:
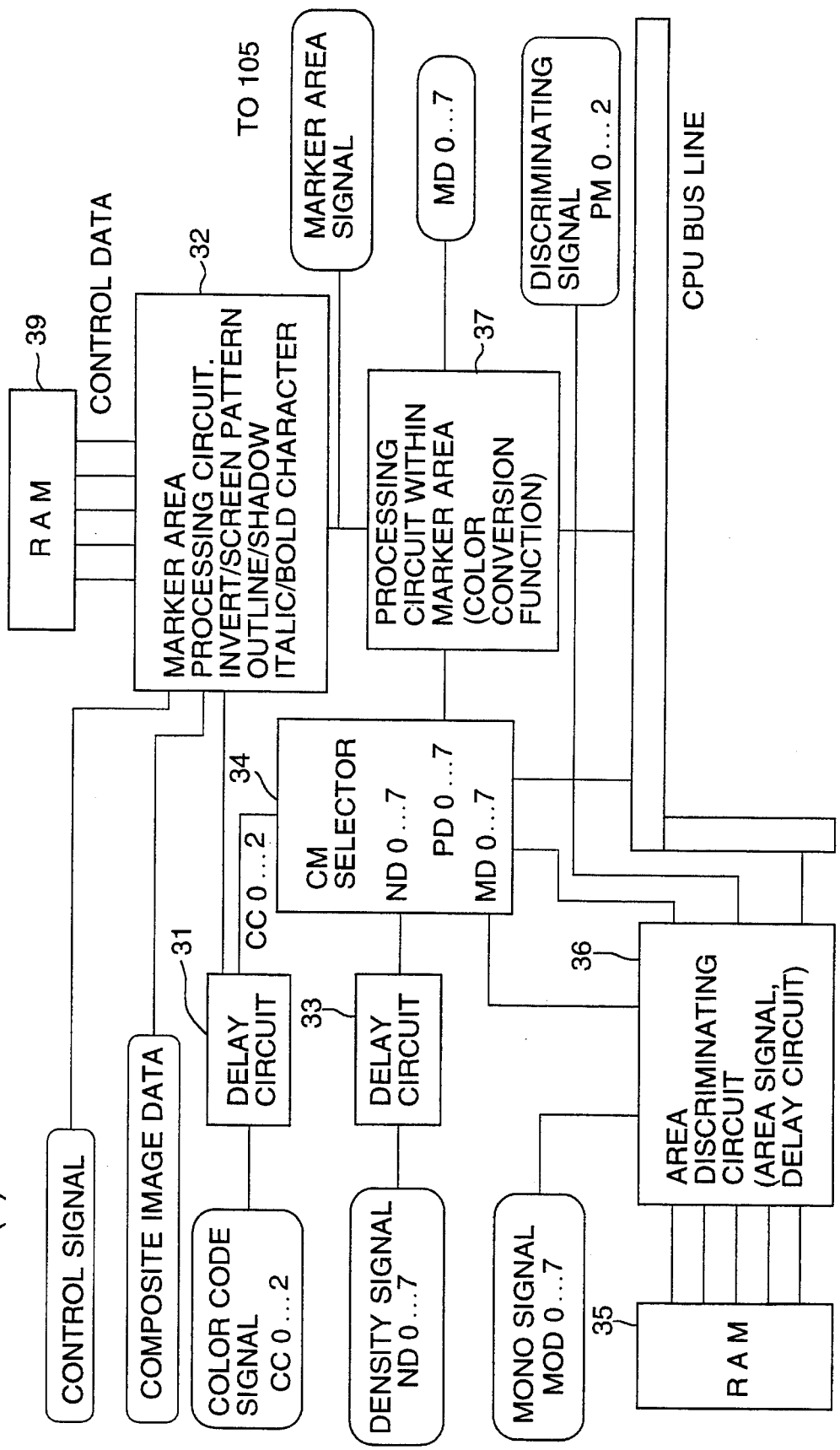
FIG. 4(a) is a block diagram showing a marker edit processing section of the image processing section.
FIG. 4(b) shows various processing corresponding to marker edit data, at the time of regular scanning.

The monochrome density signal MOD is inputted into an area discrimination circuit 36. In the area discrimination circuit 36, it is discriminated according to the monochrome density signal MOD that the document image is a photographic image having gradation, or a character/line image which is formed by characters and lines, and the discriminated result is outputted as a discrimination signal PM for each pixel. In FIG. 4, numeral 35 is a RAM as a work memory provided in the area discrimination circuit 36.

Figure 5:
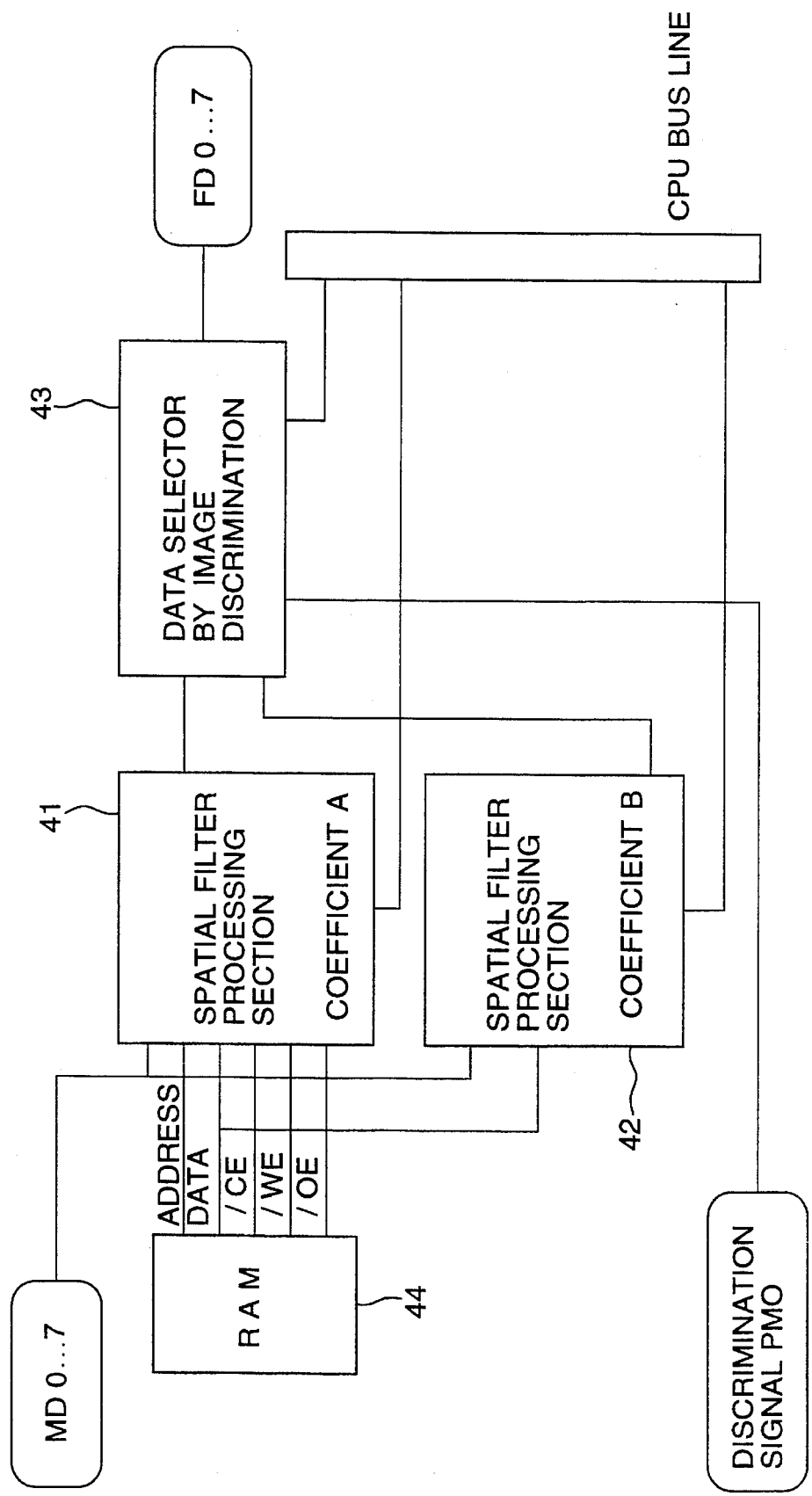
FIG. 5 is a block diagram showing a space filter processing section of the image processing section.

A density signal MD, obtained after marker edit processing has been carried out, which is outputted through the processing circuit within a marker area 37, is gradation-conversion-processed in a space filter processing section as shown in FIG. 5.

The space filter processing circuit is provided with two space filter processing circuits 41 and 42 in which gradation conversion is carried out according to different coefficients A and B. One of the density data, which are respectively gradation-processed by these circuits 41 and 42, is selected corresponding to the discrimination signal PM by image discrimination in the data selector 43, and is outputted as density data FD.

Characteristics of gradation processing can be automatically changed to be, for example, sharp or soft depending on whether the document image is a photographic image or a character/line image.

In FIG. 5, numeral 44 is a RAM as a work memory for a space filter processing calculation.

Figure 6:
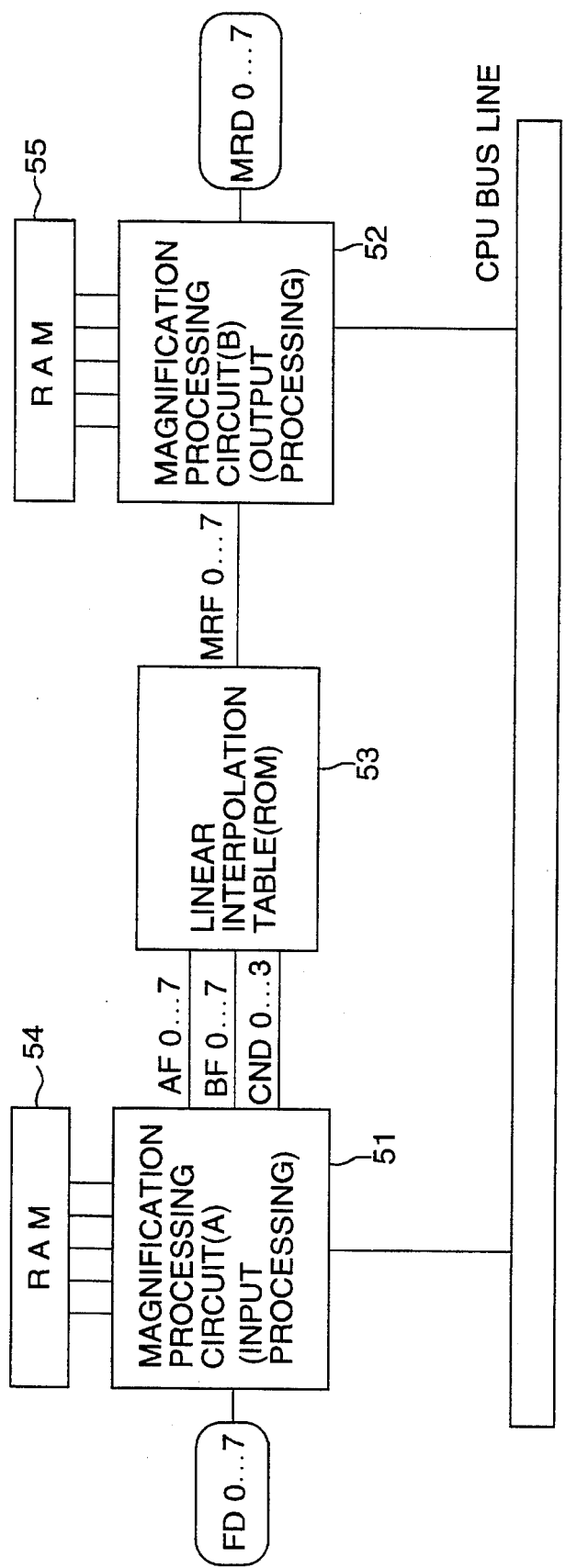
FIG. 6 is a block diagram showing a magnification processing section of the image processing section.

Density data FD, on which gradation conversion processing is conducted in the space filter processing circuit shown in FIG. 5, is sent to a magnification processing section shown in FIG. 6.

The magnification processing section comprises: an input magnification processing circuit (A) 51; an output magnification processing circuit (B) 52; a linear interpolation table (ROM) 53; and RAMs 54, 55 which are respectively provided in the magnification processing circuit (A), and (B).

Due to the foregoing structure, image processing is carried out, by which the document is enlarged or reduced according to a selection command of a variable magnification ratio. For example, at the time of enlargement processing, the linear interpolation between density data of pixels adjoining the direction of the line of CCD sensor elements (the direction of primary scanning), is carried out, and linearly interpolated density data are outputted as converted data. At the time of reduction processing, the number of pieces of density data is reduced in the direction of the line of CCD sensor elements (the direction of primary scanning), and remaining density data are outputted as converted data. In the direction of secondary scanning crossing the direction of primary scanning at right angles (the direction of movement of halogen light source 125: the direction of optical scanning), the amount of data is increased or decreased when the reading speed (scanning speed) is changed, and enlargement/reduction processing can be carried out.

Figure 7:
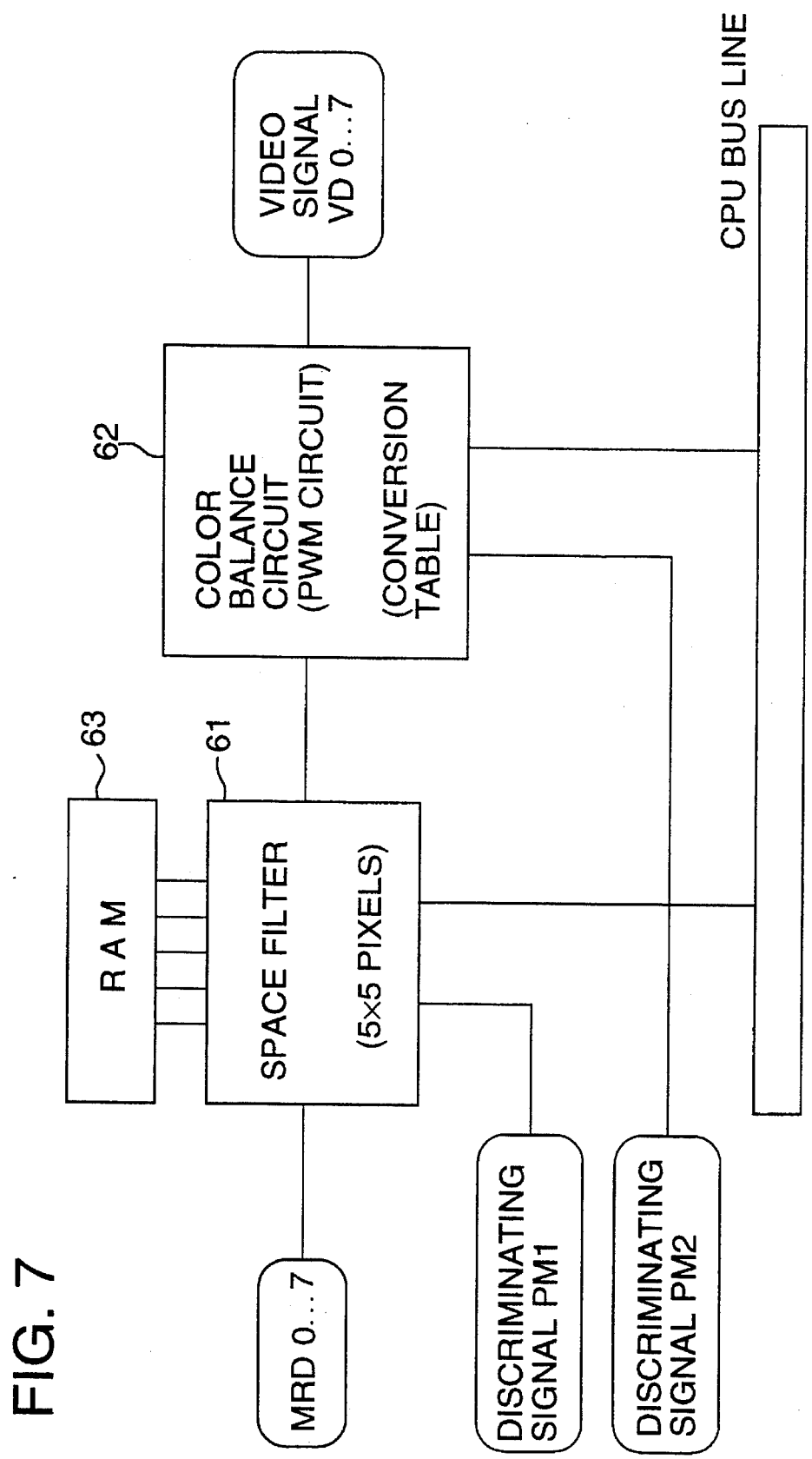
FIG. 7 is a block diagram showing a color balance processing section of the image processing section.

Density data MRD, in which magnification processing has been carried out, is processed in a color balance processing section as shown in FIG. 7 in order to avoid occurrence of moire caused by enlargement/reduction processing.

In FIG. 7, the density data MRD after enlargement/reduction processing is processed by a space filter 61, color balance is adjusted by a color balance circuit (PWM circuit) 62, and then, the density data MRD is converted into a video signal VD. The video signal VD is supplied to a writing unit B.

In FIG. 7, numeral 63 is a RAM for operation of the space filter 61.

Figure 8:
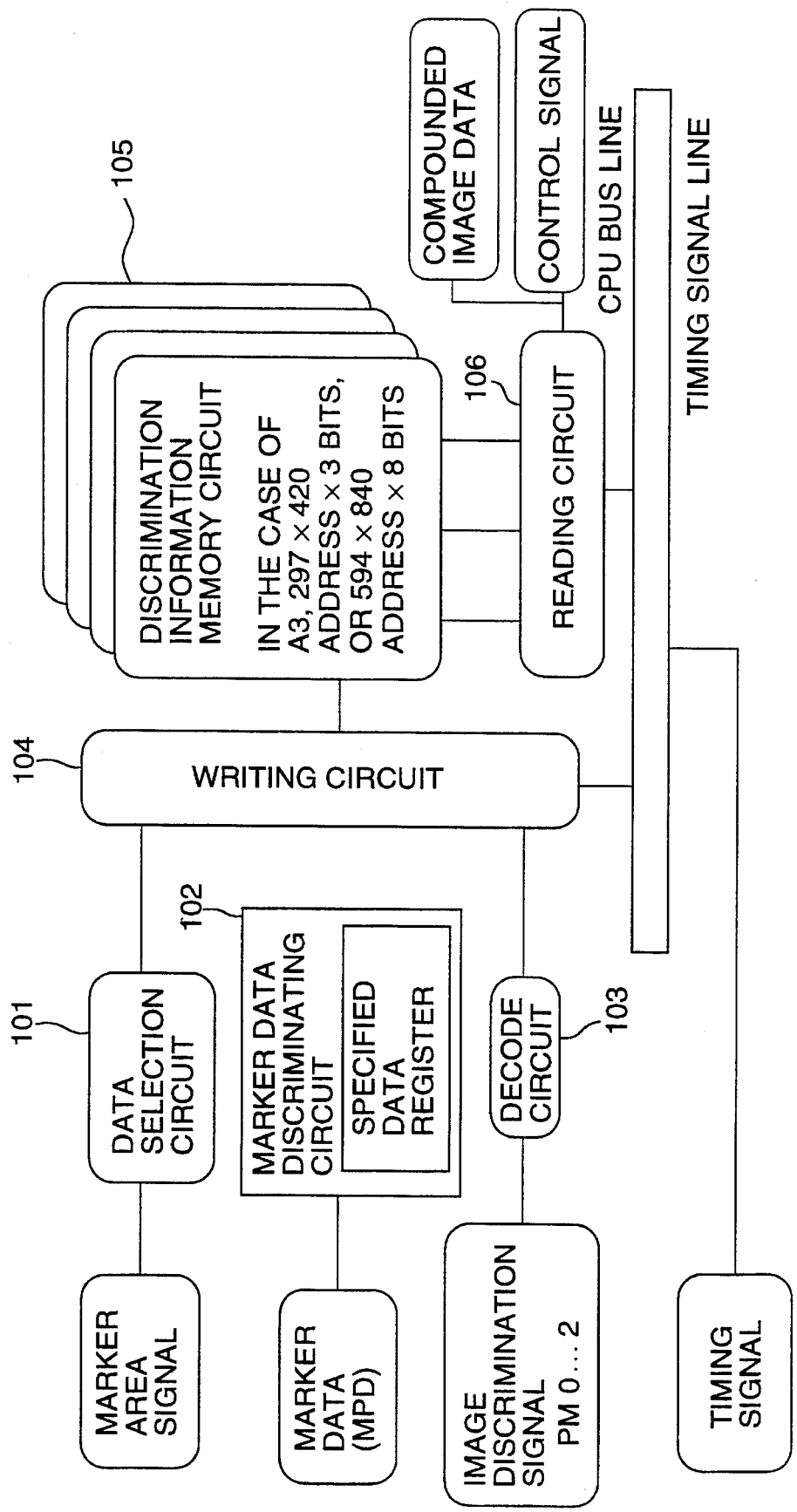
FIG. 8 is a block diagram showing a processing document discrimination data unit of the image processing section.

FIG. 8 is a view showing a document discrimination data unit in which various image discrimination information obtained by pre-scanning are stored.

Here, an image discrimination signal PM obtained by pre-scanning is stored at each pixel in a discrimination information memory circuit 105 through a decode circuit 103 and a writing circuit 104. The marker data MPD is inputted into a marker data discrimination circuit 102. The marker data discrimination circuit 102 specifies a write-bit of the marker area signal with respect to edit data in the discrimination information memory circuit 105 through a data select circuit 101. According to the specification, the marker area signal is written in the discrimination information memory circuit 105 as marker edit data through the writing circuit 104. The marker edit data is data for each pixel by which marker processing at the time of regular scanning is specified, and it is discriminated by discrimination for each bit what processing should be conducted on each pixel.

Various image discrimination information stored in the discrimination information memory circuit 105 are read out by a CPU 71, which will be described later, through a read-out circuit 106 at the time of regular scanning. According to information obtained by the reading operation, image data in the image processing area specified by a color marker is image processed and outputted.

Image data other than various control information can be stored also in the discrimination information memory circuit 105. Image data to be synthesized which is stored in advance in the discrimination information memory circuit 105 is outputted to the marker area processing circuit 32, and image data can be synthesized. Accordingly, the discrimination information memory circuit 105 corresponds to an image memory means in this example.

Figure 9:
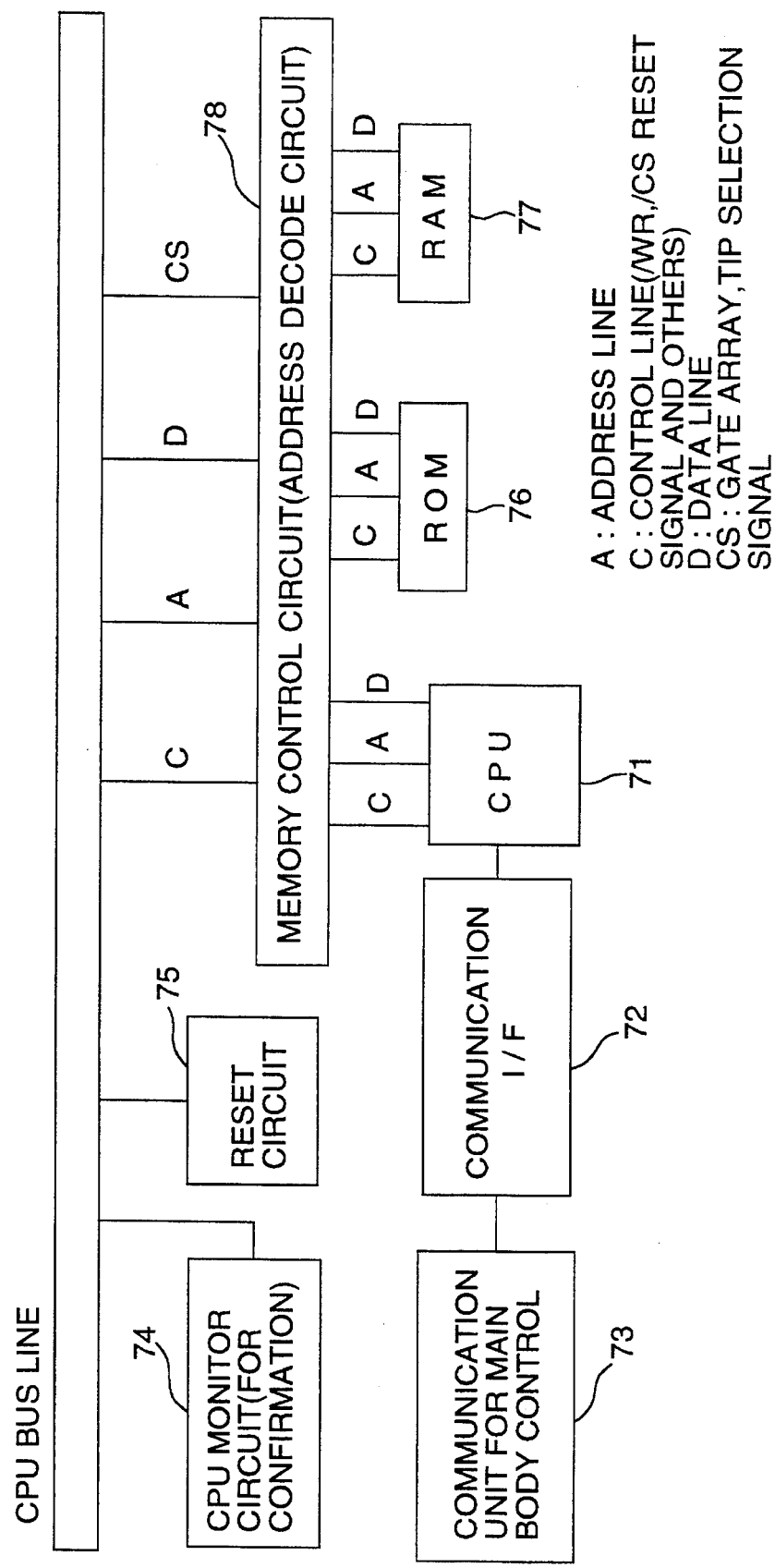
FIG. 9 is a block diagram showing a microcomputer section of the image processing section.
Figure 10:
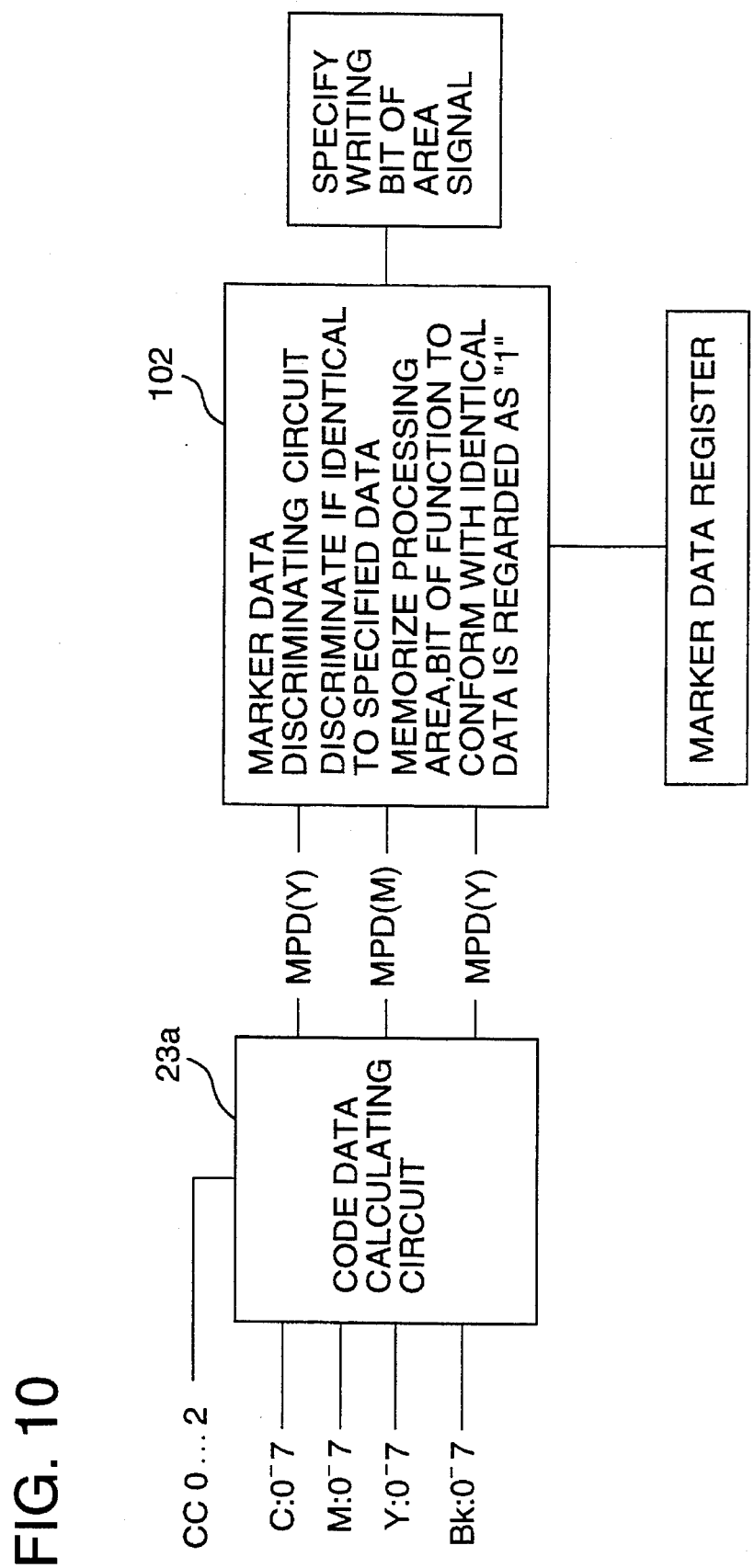
FIG. 10 is a block diagram showing a calculation/discrimination circuit of a marker data.

FIG. 9 is a view showing a microcomputer section including a CPU 71, by which processing circuits are controlled, and its peripheral circuits. Processing circuits shown in FIG. 2 to FIG. 8 are connected with the CPU 71 through a CPU bus line.

Further, the CPU 71 specifies recording sheets and makes a report of a detection result of the size of the document to a communication unit 73 in a printer main body section (the writing unit B, the image forming section C) through a communication interface 72.

In addition to the foregoing structure, a CPU monitor circuit 74, a reset circuit 75, a ROM 76, a RAM 77, and an address decode circuit 78 are shown in FIG. 9.

Image processing functions using a color marker in the example will be described in detail as follows.

Figure 11:
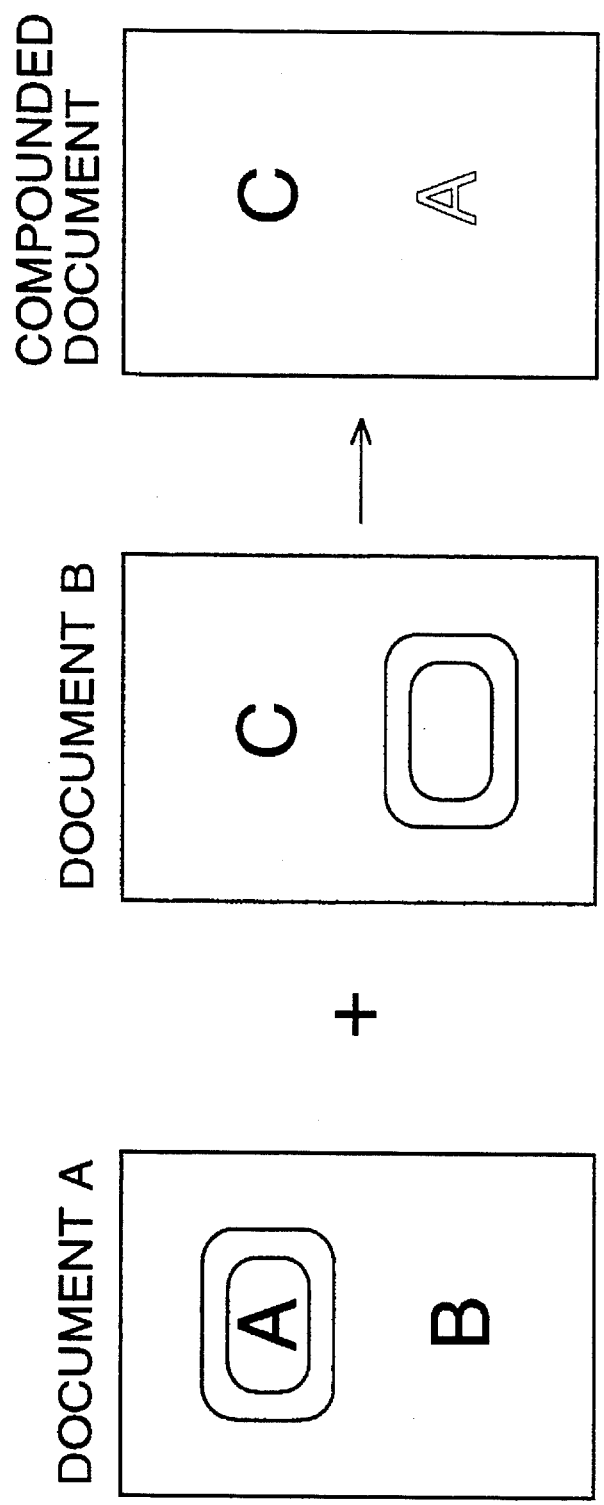
FIG. 11 is a view showing an example of synthesis of two document images.

In the example, as shown in FIG. 11, a synthesized copy of two documents A and B can be obtained by an edit function using the marker pen.

That is, in FIG. 11, the document A is a document including a character [A] and a character [B], and the document B is a document including a character [C]. When it is desired to synthesize the character [A] included in the document A to an area under the character [C] of the document B, an area of [A], which is an image to be extracted from the document A, is enclosed by a closed loop formed by a color marker in the In addition an area, in which the character [A] is reproduced in the document B, will be also specified by the color marker of the same color. When these documents A and B are read respectively by the digital type copier structured as described above, a synthesized image copy including [C] and [A] can be obtained as shown in FIG. 11.

The foregoing image synthesis (image replacement) can be combined with each kind of image processing such as partial color conversion, or halftoning, and for example, the character [A] after synthesis can be reproduced using the marker color having been used for area specification.

Figure 12:
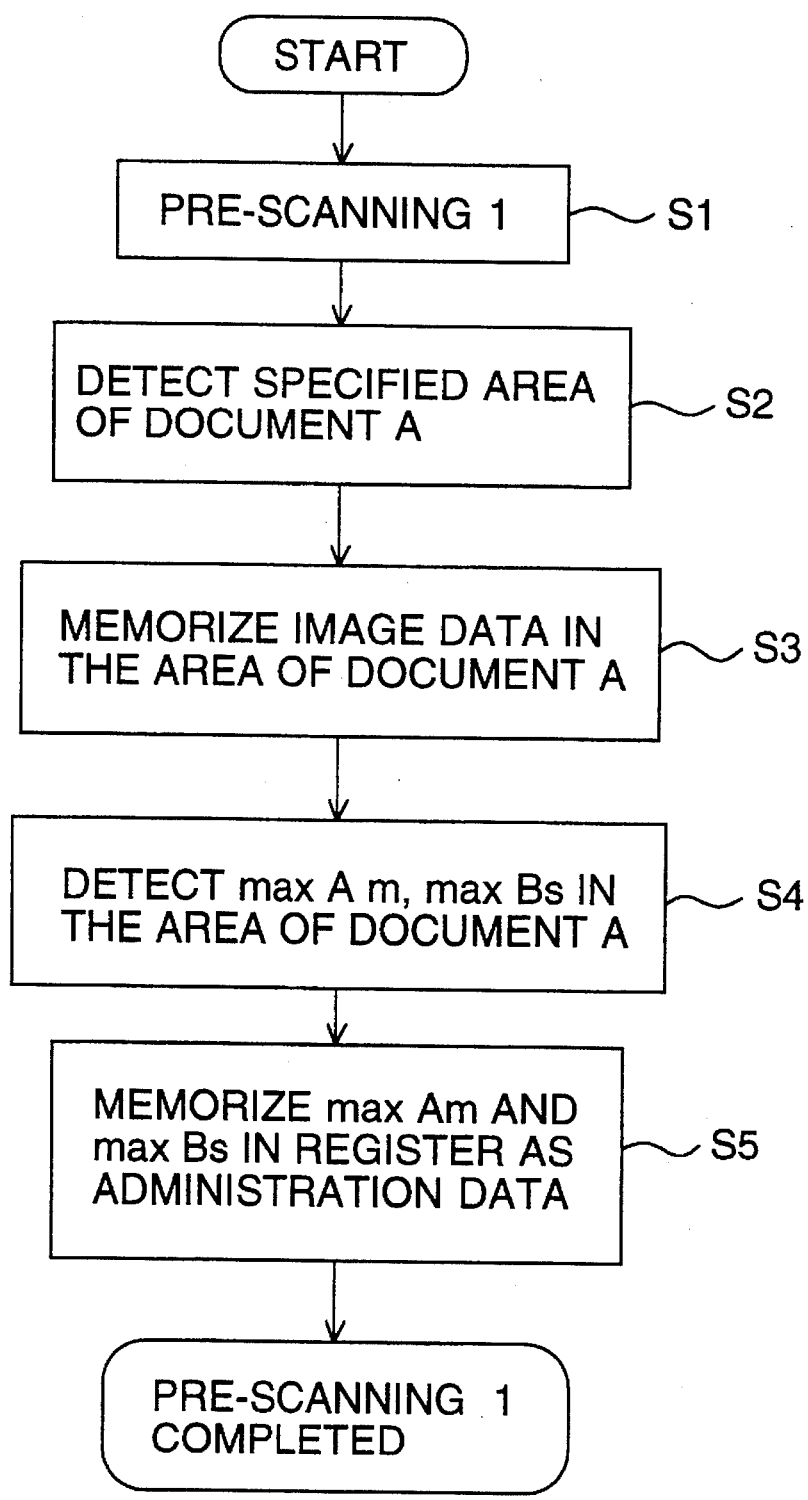
FIG. 12 is a flow chart showing first pre-scanning control of the example in which a memory is used.
Figure 13:
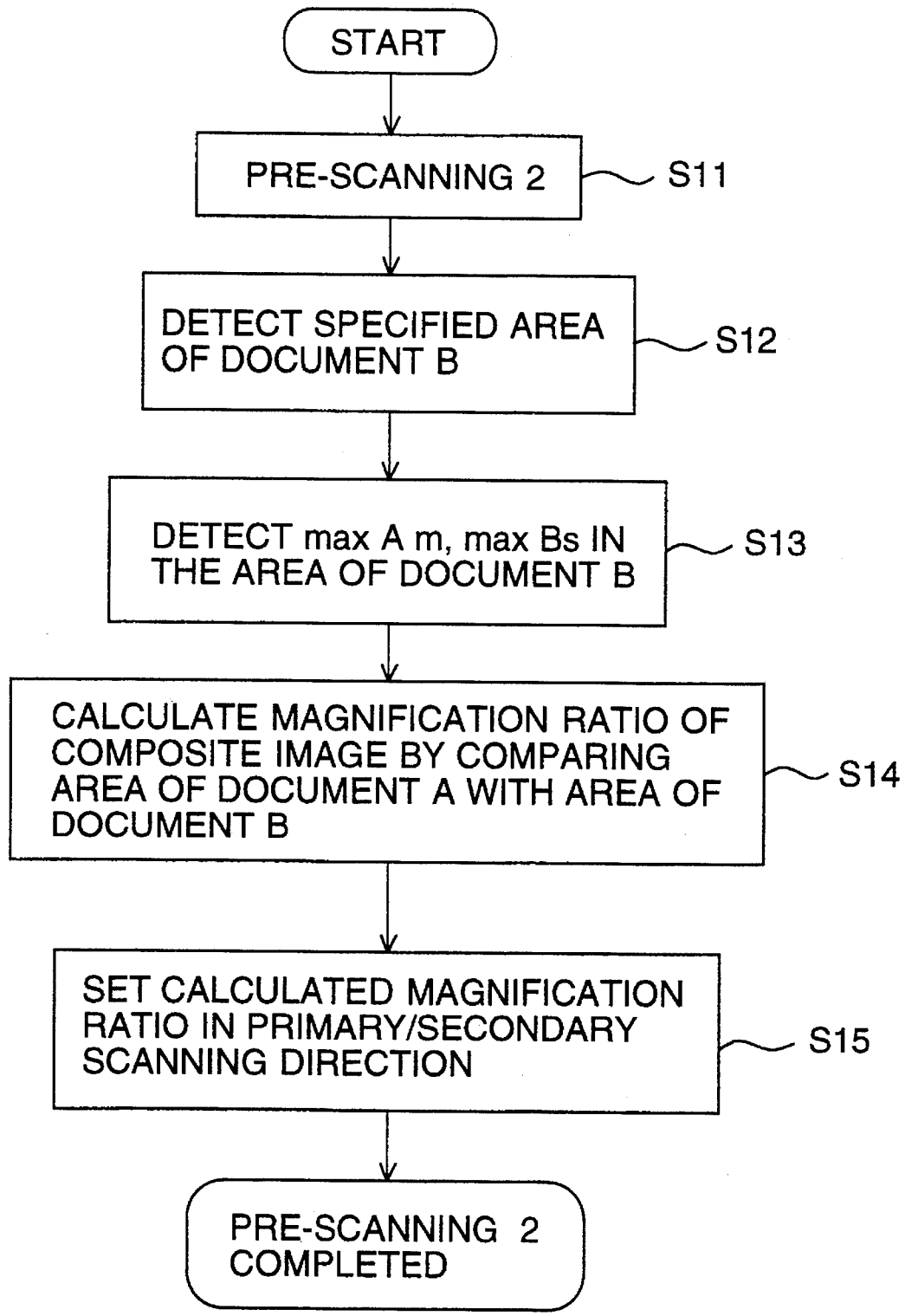
FIG. 13 is a flow chart showing second pre-scanning control of the example in which the memory is used.
Figure 14:
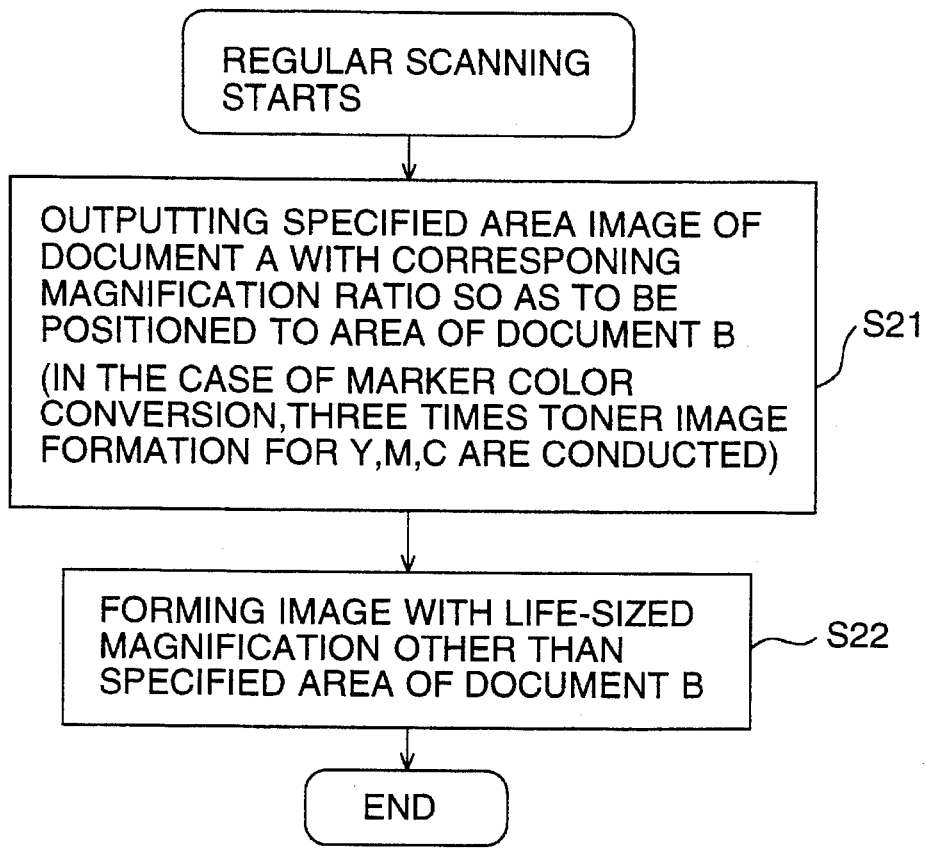
FIG. 14 is a flow chart showing regular scanning control of the example in which the memory is used.

Next, referring to flow charts shown in FIG. 12 to FIG. 14, the function of the foregoing image synthesis (image replacement) will be described in detail as follows.

Figure 15:
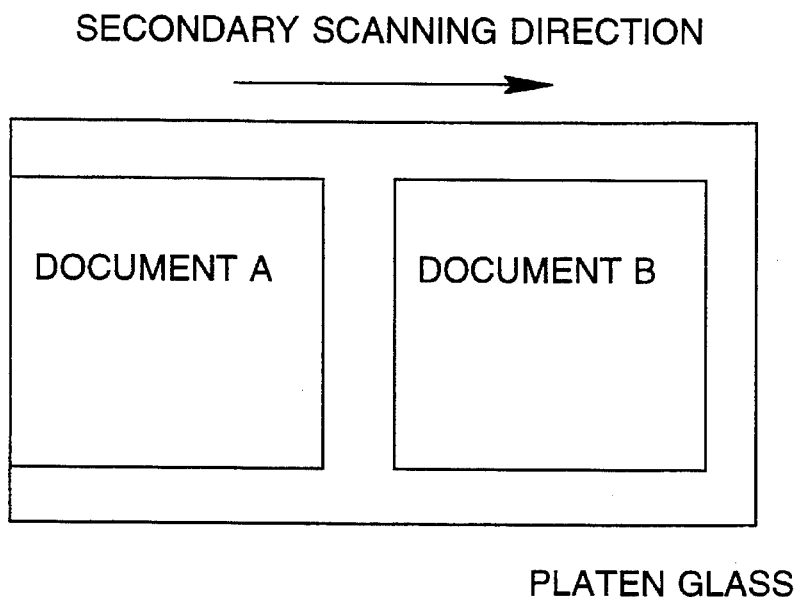
FIG. 15 is a view showing conditions of replacement under which two A4-sized documents are placed on a platen glass for A3-sized documents.
Figure 16:
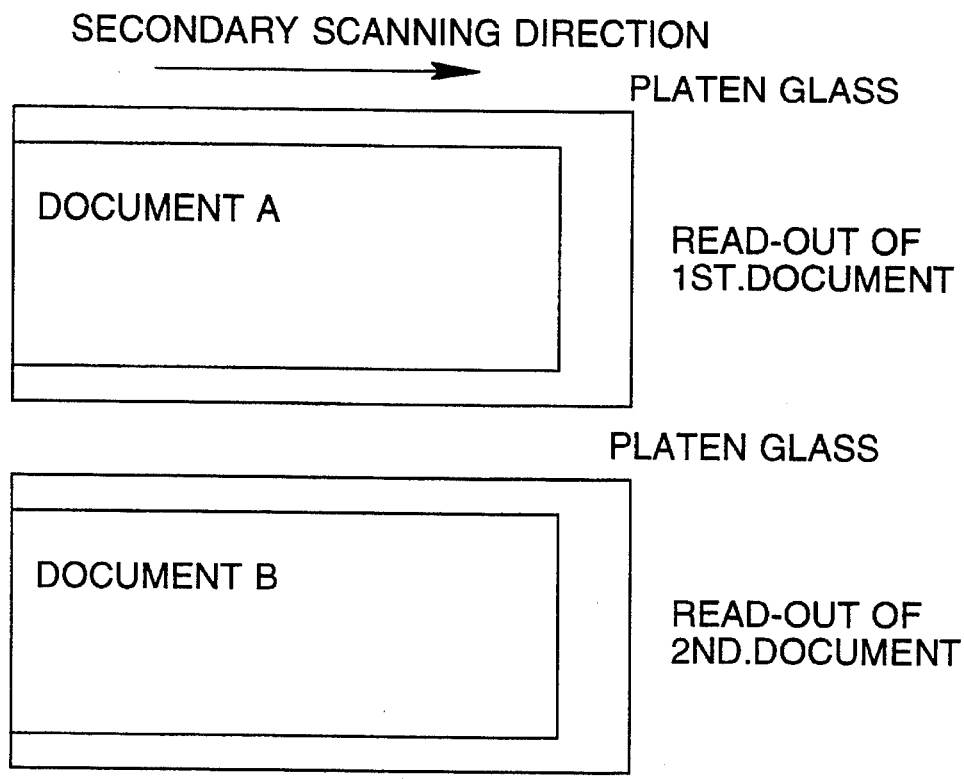
FIG. 16 is a view showing an example in which A3-sized documents are selectively placed on the A3-sized platen glass.

At first, as shown in FIG. 11, the document A in which an area of an image to be replaced is specified by a color marker, and the document B in which an area, to which the foregoing image is to be transferred, is specified by the same color marker, are placed on the platen glass 2 respectively. When the size of the platen glass 2 is A3, two documents of size A4 can be placed concurrently as shown in FIG. 15. However, when the size of the documents A and B is A3, the documents A and B are selectively placed on the platen glass 2 by ADF or manually as shown in FIG. 16.

When two documents are concurrently placed on the platen glass 2, two documents (the document A including the image to be replaced, the document B in which the destination of the image is specified) are discriminated according to their positional relations. When the documents are selectively placed on the platen glass 2, the document A is preferably discriminated from the document B according to the order of the documents.

When the document is set on the platen glass 2, the first pre-scanning is carried out (S1). At first, the document A is read, an image area specified by a color marker on the document A is detected according to a color code signal (S2), and color information (marker data) of the color marker is stored. Then, image data in the detected area (the image to be replaced) is stored in the discrimination information memory circuit 105 (S3).

Figure 17:
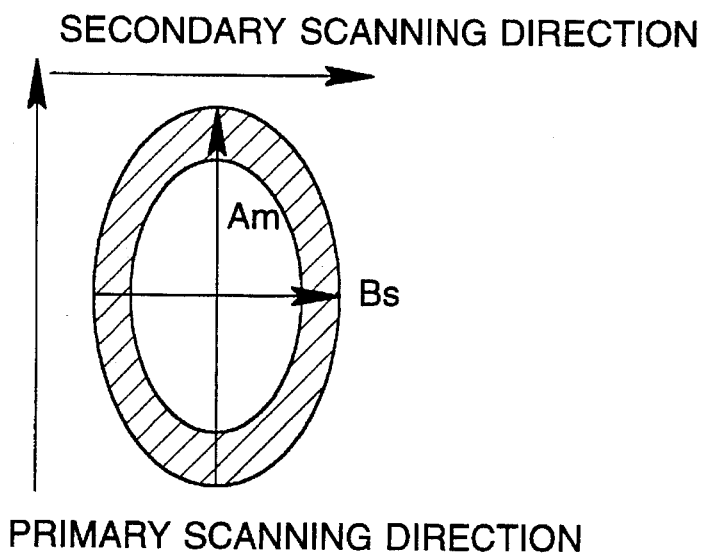
FIG. 17 is a view showing a parameter by which dimensions of a marker area is expressed.

When the area specified by the color marker (marker area) on the document A is detected, the maximum width Am in the primary scanning direction of the marker area, and the maximum width Bs in the secondary scanning direction of the marker area are found in order to set the variable magnification ratio of the image to be replaced, which will be described later (S4; refer to FIG. 17). These data Am and Bs are stored in a register as administration data of an image processing CPU 71 (S5).

Next, the second pre-scanning is carried out (S11), and the area specified by the same color marker on the document B as the document A, that is, the area in which the image in the specified area on the document A is synthesized (the specified area) is detected (S12).

Whether the colors of color markers are the same or not is discriminated in the following manner. Color information of the color marker obtained by pre-scanning the document A is stored in a register of the marker discrimination circuit 102; and the marker color detected by reading the document B is compared with the marker color stored in the register.

When the marker area (the specified area) is detected on the document B, the maximum width Am in the primary scanning direction of the marker area, and the maximum width Bs in the secondary scanning direction are found in the same manner in order to set the variable magnification ratio of the image to be replaced (S13).

Figure 18:
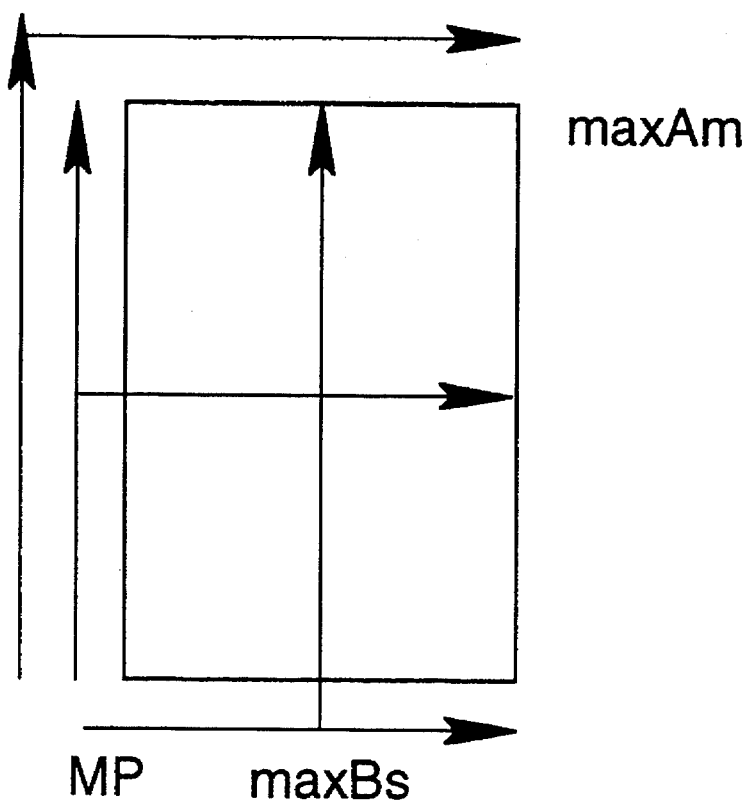
FIG. 18 is a view showing conditions of discrimination of the marker area .

Here, the position of the specified area is recognized in the following manner. The widest portions Am and Bs are recognized as the starting point of Bs (Bsx1,Bsy1), the last stop (Bsx2, Bsy2), and the starting point of Am (Amx1, Amy1), the last stop (Amx2, Amy2) from the width of the primary scanning direction and the secondary scanning direction of the marker area signal. Accordingly, the specified area is recognized as a square area which is set in the manner that the base point (Amx1, Bsy1) of the primary scanning direction and the secondary scanning direction is defined as a point for specifying the area, and the maximum width Am and Bs are given to the point (refer to FIG. 18).

Next, the maximum width Am and Bs of the recognized area of the document A are compared with those of the document B, and variable magnification ratios in the primary scanning direction and the secondary scanning direction are calculated respectively so that the specified image of the document A is synthesized to the specified area of the document B (S14). Then, variable magnification ratios thus calculated are set as variable magnification ratios with respect to 'the image to be replaced' which is specified by the color marker on the document A (S15).

Figure 19:
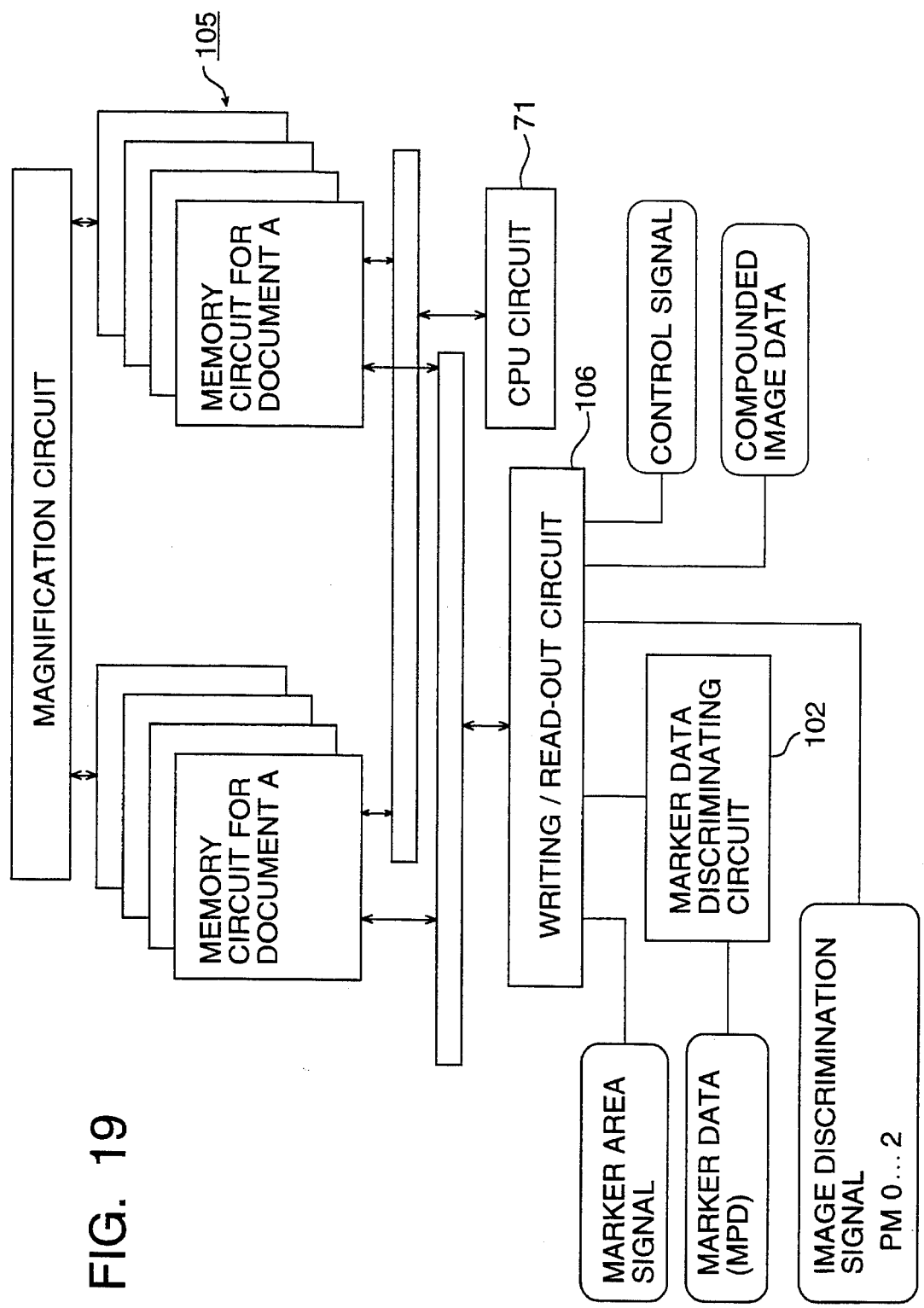
FIG. 19 is a block diagram showing a structure in which the document image is variably magnified using the memory.
Figure 20:
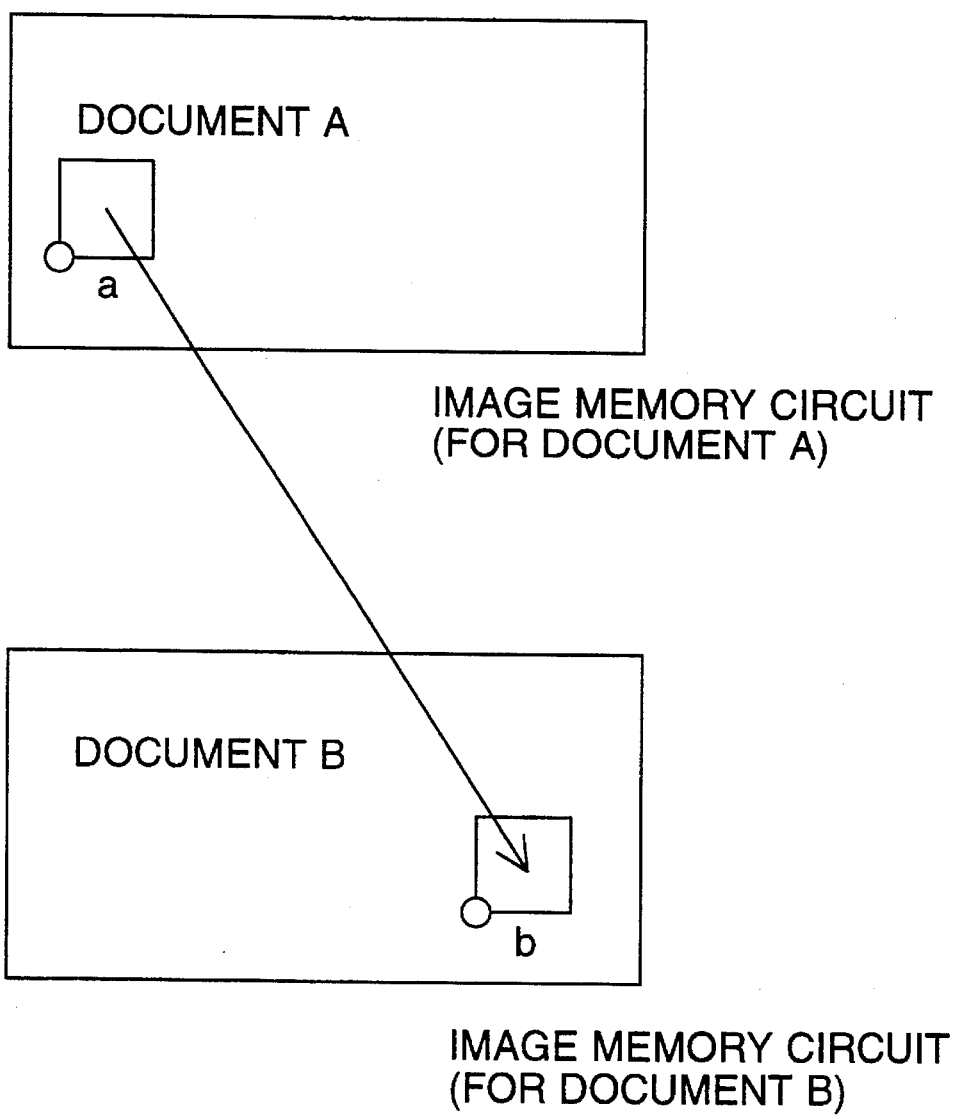
FIG. 20 is a view showing conditions under which replaced images between memories are transferred.

As shown in FIG. 19, the memory circuit for the document A in which 'the image to be replaced' is specified and the memory circuit for the document B in which the destination area (synthesizing designation area) of the image is specified, are provided in the memory circuit 105. 'The image to be replaced' specified on the document A is detected by pre-scanning as described above, and the image data is stored in the memory circuit for the document A together with the area information as shown in FIG. 20. Information of the specified destination area, which is detected on the document B, is also stored in the memory circuit for the document B as shown in FIG. 20.

As described above, when information of the image to be replaced and the destination area (the specified area) are stored, the following operations are carried out. Before regular scanning, 'the image to be replaced' is variable-magnification-processed corresponding to the variable magnification ratio set in the foregoing operation. Image data is transferred from the memory circuit for the document A to the memory circuit for the document B, and data of 'the image to be replaced' on the document A which is variably magnified according to the magnification ratio specified by the marker, and to which information of the specified reproduction area is given, is set in the memory circuit for the document B (S21). Due to the foregoing, the image information to synthesize to the image of the document B (synthesizing image data) and its position can be discriminated when these data are read from the memory circuit for the document B.

When the color of 'the image to be replaced' is converted into the marker color, and the image is synthesized to the document B, data of the 'image to be replaced' of the document A is given as density data for each primary color. Accordingly, in the foregoing magnification processing, magnification processing is conducted for each primary color, and data for each primary color after the magnification processing is set in the memory circuit for the document B.

When regular scanning is carried out in order to read the document B, synthesizing image data is read from the memory circuit for the document B corresponding to the reading position in regular scanning, and is outputted to a marker area processing circuit 32. Due to the foregoing, the read image in regular scanning (the image other than the specified area on the document B) and the synthesizing image stored in the memory in the foregoing pre-scanning (the image in the specified area on the document A) are synthesized, and the recording operation is carried out.

When, for example, color conversion is specified in addition to the foregoing image synthesizing processing (image replacement), specified image processing is conducted on the synthesizing image (the image to be replaced; marker area) in the marker area processing circuit 32 or a processing circuit within marker area 37 in addition to the foregoing synthesis. Due to the foregoing, as shown in FIG. 11, a copy of the synthesized image is obtained in which the specified image on the document A is reproduced in the specified area on the document B. Further, the image on the document A can be reproduced in the manner that the image is variably magnified corresponding to the ratio of the dimension of the specified area of 'the image to be replaced' on the document A and that of the specified area for synthesis on the document B. Accordingly, an image can be synthesized between two documents simply when a marker pen is used for specifying an area. Further, it is not necessary for an operator to calculate a desired magnification ratio, and an arbitrary magnification ratio can be set by specifying with the marker.

When an area on the document B is not specified by the same color marker as the document A, it is preferable that a message is outputted to an operational section in order to make certain designation of the area on the document B. Further, when areas to which the image of the document A is synthesized are specified on plural documents B, it is preferable that an area which is recognized to be nearest to a starting point of the primary scanning direction and the secondary scanning direction is selected as a destination area, or the same image is respectively synthesized to a plurality of areas.

In the foregoing example, the synthesizing image is stored in the memory circuit, the stored synthesizing image is read at the time of regular scanning on the document B and synthesized on the image data, and outputted. However, when a toner image corresponding to an image other than the specified area on the document B is formed on the photoreceptor drum 151, and further, a toner image corresponding to the synthesizing image on the document A is formed in the manner that a subsequent toner image is superimposed onto the former toner image, the image can be synthesized on the photoreceptor drum 151.

Figure 21:
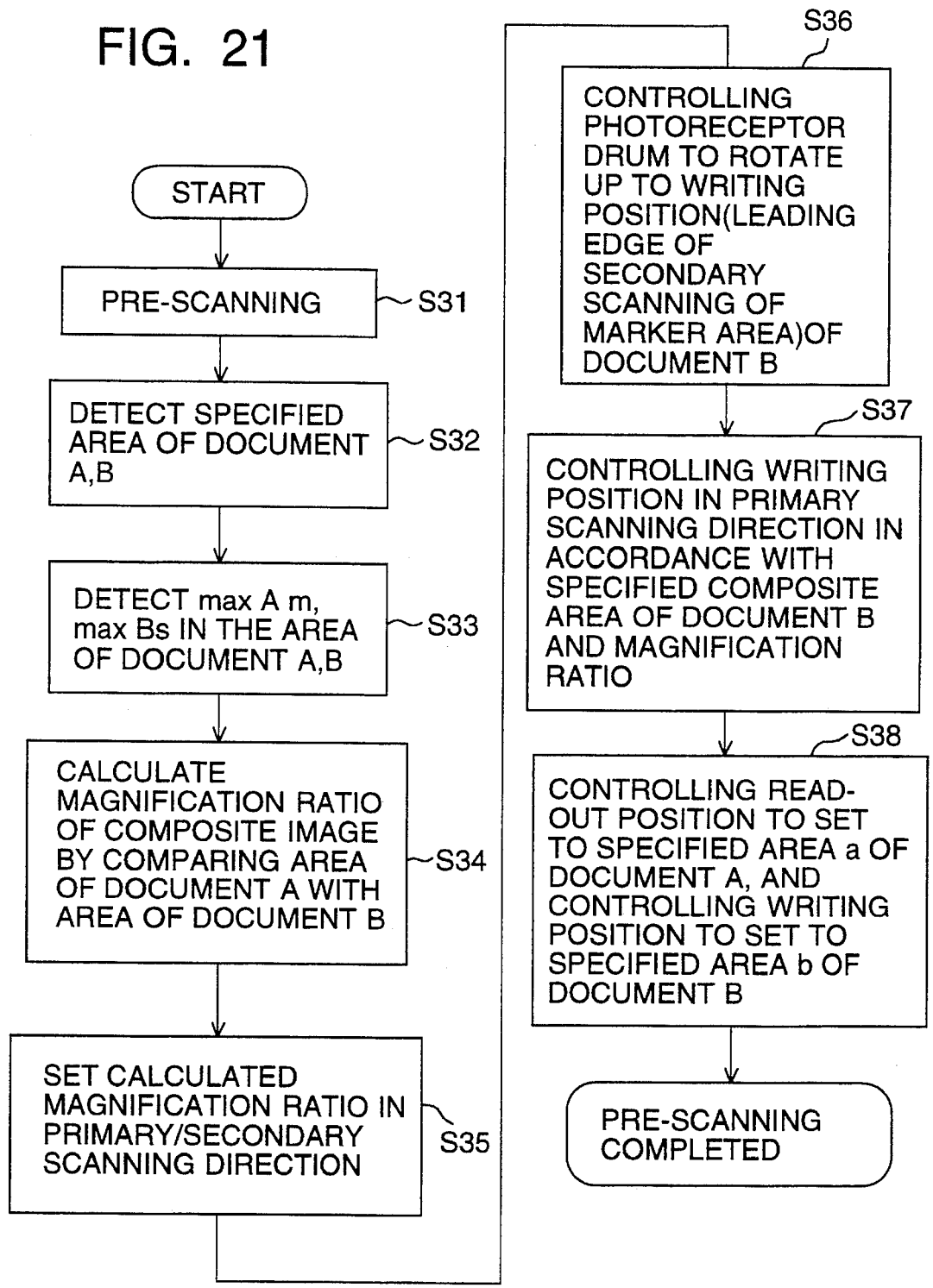
FIG. 21 is a flow chart showing pre-scanning control of an example in which images are synthesized on a drum.
Figure 22:
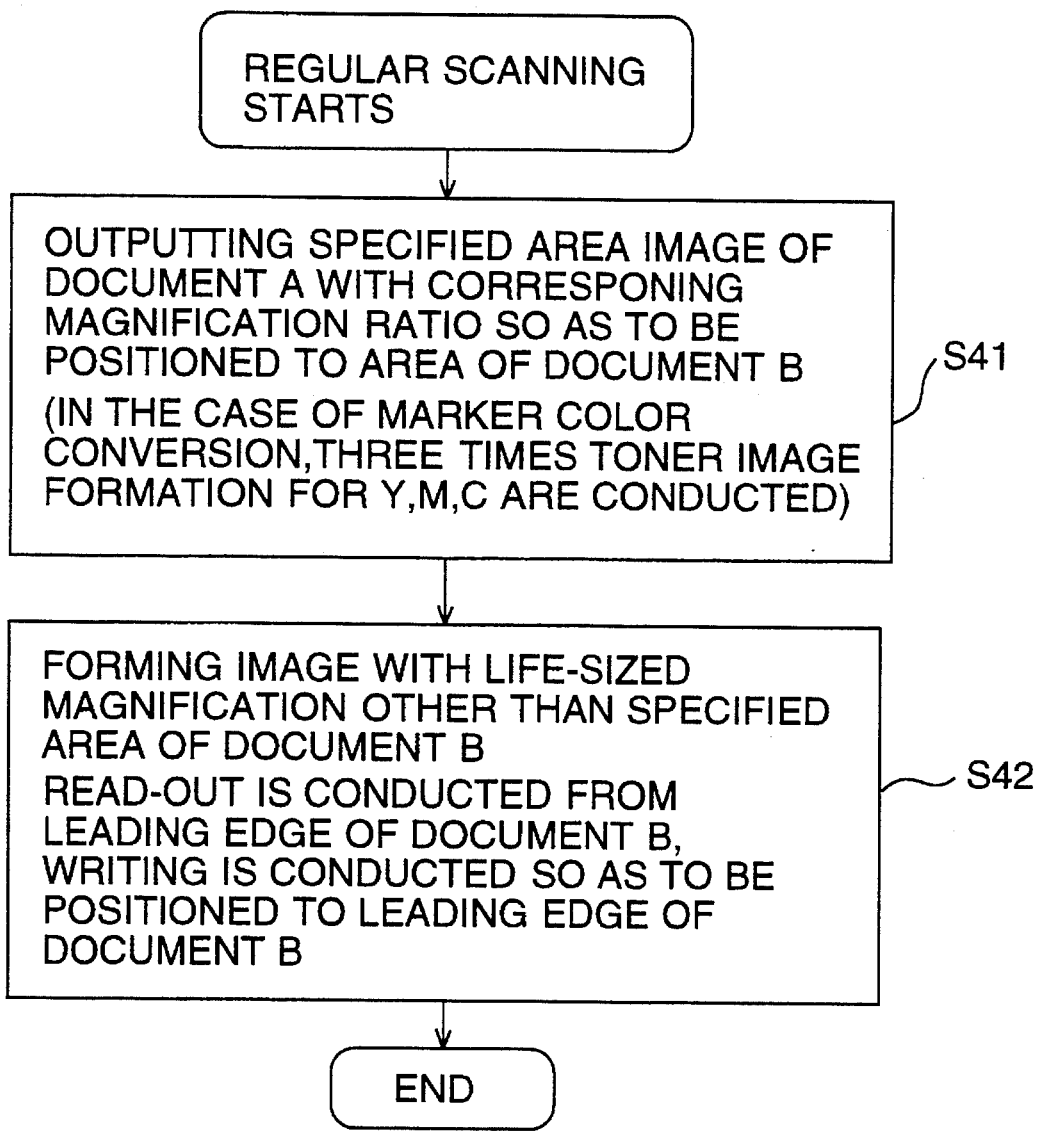
FIG. 22 is a flow chart showing regular scanning control of an example in which images are synthesized on the drum.

An example in which the image is synthesized on the photoreceptor drum 151 as described above will be explained according to flow charts shown in FIG. 21 and FIG. 22.

At first, pre-scanning is carried out (S31), documents A and B are read respectively, and areas specified by the color marker on documents A and B (the specified area of the image to be replaced, the specified area for synthesizing) are detected (S32).

Next, dimensions of marker areas on documents are respectively found in the primary scanning direction and the secondary scanning direction (S33), and variable magnification ratios are respectively calculated in the primary scanning direction and the secondary scanning direction when dimensions of marker areas are compared with each other (S34). Then, in order to conduct variable magnification processing according to the result of the calculation, the variable magnification ratio in the primary scanning direction in the magnification processing circuit shown in FIG. 6 and that in the secondary scanning direction due to the variable scanning speed are set (S35).

Next, the rotation of the photoreceptor drum 151 is controlled according to a synthesis designation area specified by the color marker in the document B (S36); a starting position of writing in the primary scanning direction is controlled (S37) according to the synthesis designation area and the variable magnification ratio; and the writing position of the image to be synthesized is set in the primary scanning direction and secondary scanning direction.

Position control for reading in the regular scanning is carried out in the manner that reading of the area in which the image to be replaced in the document A is specified (S38). In this case, the writing section is positioned in the synthesis designation area in the document B as described above.

Next, regular scanning is started, and the area of the image to be replaced in the document A is read. The image to be replaced in the document A is read after magnification processing is carried out by signal processing in the primary scanning direction, and by scanning speed control in the secondary scanning direction according to the dimension of the specified area in the document B. After positioning in the specified area in the document B, 'the image to be replaced', which has been read in the foregoing, is formed on the photoreceptor drum 151 as a toner image (S41).

When the marker edit function for color conversion is selected simultaneously with image synthesis, toner images of the three primary colors are superimposed for color reproduction. Accordingly, formation of the toner image corresponding to the image to be replaced is repeated three times.

After the image to be replaced in the document A is variably magnified according to dimensions in the specified area and and formed as a toner image on the photoreceptor drum 151 according to the position in the specified area, the document B is regularly read from its leading edge portion, and the image out of the synthesis designation area is positioned in the document B and formed with the same magnification ratio on the photoreceptor drum 151 as a toner image (S42).

Even in the case where an image is included in the synthesis designation area in the document B, when the specified area is masked, the image in the document A can be synthesized.

As described above, at first, the image to be replaced in the document A is read, magnification processed at the specified magnification ratio, and formed as a toner image in the position corresponding to the synthesis designation area on the photoreceptor drum 151. Next, the image out of the synthesis designation area in the document B is formed as a toner image on the photoreceptor drum 151 without changing its position in the document B at the same magnification ratio. As a result of the foregoing, the image to be replaced in the document A and the image out of the specified area in the document B are superimposed on the photoreceptor drum 151 as a toner image.

After the synthesized image has been formed on the photoreceptor drum 151 as a toner image, the image is regularly transferred onto a recording sheet, and fixed, so that a copy on which a desired synthesized image is recorded can be obtained.

As described above, when the apparatus is structured in the manner that images are superimposed on the photoreceptor drum 151 as a toner image so that the document A is synthesized onto the document B, it is not necessary to provide a memory to store image data, so that the structure of the apparatus can be made simple.

Further, in the document B, other than the synthesis designation area, various image processing can be specified using markers in different colors. For example, in the document B as shown in FIG. 11, the character section 'C' is enclosed for designation by a marker which is a different color from that of the color marker used for the image synthesis area designation. Then, with respect to the character section 'C', processing, which is different from processing specified for the image to be replaced, can be designated from various processing such as reverse, half-tone, hollow character, shadow character, italics, and emphasis, and the image of the character 'C' can be recorded.

In this example, the apparatus is structured in the manner that the image signal, which has been image-processed, is hard-copied. However, when the synthesis operation is conducted on image data using an image memory, the image may be outputted to display units such a as a CRT, and the present invention is not limited to copiers.

As described above, according to the image processing apparatus of the present invention, the image to be replaced is specified by the color marker in one document, and a reproduction area on the other document in which the image to be replaced is reproduced, is specified by the same color marker. Accordingly, an area of the image to be replaced and the reproduction designation area are respectively detected as marker areas, and the image, in which the image to be replaced is synthesized to the reproduction designation area, is obtained, and therefore, two document images can be simply synthesized only by area designation by the marker pen, which is advantageous.

Further, the variable magnification ratio is set according to the ratio of dimensions of marker areas which are used for designation of the image to be replaced and the reproduction area, the image to be replaced is discriminated by the variable magnification ratio and reproduced in the specified area, and therefore, when the synthesis operation is conducted with variable magnification, it is not necessary for an operator to calculate the desired magnification ratio and set the ratio, and an arbitrary magnification ratio can be simply specified in the document.

Further, since toner images are superimposed on the image support material so that images are synthesized, even when a memory to store image data is not provided, images can be synthesized.

What is claimed is:

1. An image processing apparatus having an image carrying body on which a toner image is formed, comprising:

(a) a reader for reading an image of a document placed on an original table by photoelectric conversion to obtain color image data;

(b) a marker area detector for detecting an image processing area specified by a color marker on each of two documents simultaneously placed on the original table according to the color image data obtained by the reader; and (c) an image replacing processor for output of image data, wherein the image replacing processor replaces on said image carrying body a first image in a first image processing area of a first of said two with a second image in a second image processing area of said a second of said two documents according to the image processing area detected by said marker area detector and the color image data obtained by said reader, and wherein the image replacing processor conducts the image replacing between image processing areas specified by the same marker color on the two documents placed on the original table.

2. An image processing apparatus having an image carrying body on which a toner image is formed, comprising:

(a) a reader for reading an image of a document placed on an original table by photoelectric conversion to obtain color image data;

(b) a marker area detector for detecting an image processing area specified by a color marker on each of two documents simultaneously placed on the original table according to the color image data obtained by the reader; and (c) an image replacing processor for output of image data, wherein the image replacing processor replaces on said image carrying body a first image in a first image processing area of a first of said two with a second image in a second image processing area of a second of said two documents according to the image processing area detected by said marker area detector and the color image data obtained by said reader, wherein said image replacing processor conducts the image replacing such that respective dimensions of both the first and second image processing areas are measured, and wherein the image replacing processor conducts a magnification processing according to a ratio of a dimension of the first image processing area and a dimension of the second image processing area.

3. An image processing apparatus having an image carrying body on which a toner image is formed, comprising:.

(a) a reader for reading an image of a document placed on an original table by photoelectric conversion to obtain color image data;

(b) a marker area detector for detecting an image processing area specified by a color marker on each of two documents simultaneously placed on the original table according to the color image data obtained by the reader; and (c) an image replacing processor for output of image data, said image replacing processor including toner image forming means for forming a toner image on the image carrying body according to said image data, and transfer and fixing means for transferring the toner image formed on the image carrying body onto recording sheets and then for fixing the transferred sheets, wherein the image replacing processor replaces on said image carrying body a first image in a first image processing area of a first of said two documents with a second image in a second image processing area of said second document according to the image processing area detected by said marker area detector and the color image data obtained by said reader, wherein a toner image corresponding to an image on the first document other than the first image and a toner image corresponding to the second image are registered on said image carrying body so that a combined toner image corresponding to an image processed for replacement is formed on the image carrying body, and wherein the combined toner image is transferred and fixed on the recording sheets by said transferring and fixing means.

* * * * *

UNITED STATES PATENT AND TRADEMARK OFFICE
CERTIFICATE OF CORRECTION

PATENT NO. : 5,539,524
DATED : July 23, 1996
INVENTOR(S) : Takashi HASEBE et al

Page 1 of 2

It is certified that error appears in the above-indentified patent and that said Letters Patent is hereby corrected as shown below:

On title page, item [54], and col. 1, line 1,
In the Title, after "APPARATUS", insert --FOR REPLACING DOCUMENT IMAGES--.

Claim 1, column 14, line 51, after "two", insert --documents--.

Claim 1, column 14, line 52, after "area of", delete --said--.

Claim 2, column 15, line 7, after "two", insert --documents--.

Claim 3, column 15, line 22, after "comprising:", delete ".".

UNITED STATES PATENT AND TRADEMARK OFFICE
CERTIFICATE OF CORRECTION

PATENT NO. : 5,539,524
DATED : July 23, 1996
INVENTOR(S) : Takashi HASEBE et al

It is certified that error appears in the above-indentified patent and that said Letters Patent is hereby corrected as shown below:

Claim 3, column 16, lines 14-15, should read --a
          second of said two documents-- not "said
second document".

Signed and Sealed this

Thirty-first Day of December, 1996

Attest:

BRUCE LEHMAN

*Attesting Officer*    *Commissioner of Patents and Trademarks*